United States Patent
Sinha et al.

(10) Patent No.: US 9,288,509 B2
(45) Date of Patent: Mar. 15, 2016

(54) METHOD AND SYSTEM FOR PROVIDING SYNCHRONIZED ADVERTISEMENTS AND SERVICES

(71) Applicant: Turner Broadcasting System, Inc., Atlanta, GA (US)

(72) Inventors: Nishith Kumar Sinha, Mableton, GA (US); Matthew Paul Giles, Marietta, GA (US); Donald Jude Loheide, Mableton, GA (US); Brainerd Sathianathan, Morgan Hill, CA (US); Balaji Gopinath, San Rafael, CA (US); Karl-Christian Wolff-Ingham, Decatur, GA (US)

(73) Assignee: Turner Broadcasting System, Inc., Atlanta, GA (US)

(*) Notice: Subject to any disclaimer, the term of this patent is extended or adjusted under 35 U.S.C. 154(b) by 0 days.

(21) Appl. No.: 14/141,995

(22) Filed: Dec. 27, 2013

(65) Prior Publication Data
US 2014/0282697 A1     Sep. 18, 2014

Related U.S. Application Data

(60) Provisional application No. 61/798,439, filed on Mar. 15, 2013.

(51) Int. Cl.
*H04N 21/41* (2011.01)
*H04N 21/23* (2011.01)
(Continued)

(52) U.S. Cl.
CPC ............. *H04N 21/23* (2013.01); *H04H 20/93* (2013.01); *H04H 60/37* (2013.01); *H04H 60/40* (2013.01); *H04H 60/82* (2013.01); *H04N 21/234* (2013.01); *H04N 21/236* (2013.01); *H04N 21/23418* (2013.01); *H04N 21/23424* (2013.01);
(Continued)

(58) Field of Classification Search
CPC ............ H04N 21/236; H04N 21/4122; H04N 21/4307; H04N 21/44204
See application file for complete search history.

(56) References Cited

U.S. PATENT DOCUMENTS

| 5,305,464 | A | 4/1994 | Frett |
| 5,410,326 | A | 4/1995 | Goldstein |

(Continued)

FOREIGN PATENT DOCUMENTS

| WO | WO 95/17746 A1 | 6/1995 |
| WO | WO 02/37316 A2 | 5/2002 |
| WO | WO 03/067459 A1 | 8/2003 |

*Primary Examiner* — Robert Hance
(74) *Attorney, Agent, or Firm* — Loza & Loza, LLP; Hopeton Walker

(57) ABSTRACT

A second screen communication device that is paired with an automatic content recognition (ACR) enabled display communication device is operable to detect presentation of a linear advertisement campaign on the ACR-enabled display communication device and control presentation of content, which is associated with the linear advertisement campaign, on the second screen communication device. The content that is associated with the linear advertisement campaign comprises a plurality of messages. The second screen communication device is operable to select one or more of the plurality of messages for presentation on the second screen communication device whenever the linear advertisement campaign is detected during the presentation on the ACR-enabled display communication device. The screen communication device may be operable to sequence through presentation of the plurality of messages on the ACR-enabled display communication device based on the selection.

16 Claims, 8 Drawing Sheets

(51) Int. Cl.

| | | |
|---|---|---|
| *H04H 60/40* | (2008.01) | |
| *H04N 21/234* | (2011.01) | |
| *H04N 21/44* | (2011.01) | |
| *H04N 21/61* | (2011.01) | |
| *H04N 21/84* | (2011.01) | |
| *H04N 21/414* | (2011.01) | |
| *H04N 21/431* | (2011.01) | |
| *H04N 21/442* | (2011.01) | |
| *H04N 21/43* | (2011.01) | |
| *H04N 21/236* | (2011.01) | |
| *H04N 21/643* | (2011.01) | |
| *H04H 60/37* | (2008.01) | |
| *H04H 20/93* | (2008.01) | |
| *H04H 60/82* | (2008.01) | |
| *H04N 21/432* | (2011.01) | |
| *H04N 21/472* | (2011.01) | |
| *H04N 21/81* | (2011.01) | |
| *H04N 21/858* | (2011.01) | |
| *H04N 21/24* | (2011.01) | |
| *H04N 21/435* | (2011.01) | |

(52) U.S. Cl.
CPC ....... *H04N21/2407* (2013.01); *H04N 21/4122* (2013.01); *H04N 21/4126* (2013.01); *H04N 21/41407* (2013.01); *H04N 21/431* (2013.01); *H04N 21/435* (2013.01); *H04N 21/4307* (2013.01); *H04N 21/4316* (2013.01); *H04N 21/4325* (2013.01); *H04N 21/442* (2013.01); *H04N 21/44008* (2013.01); *H04N 21/44204* (2013.01); *H04N 21/472* (2013.01); *H04N 21/47205* (2013.01); *H04N 21/6125* (2013.01); *H04N 21/6175* (2013.01); *H04N 21/64322* (2013.01); *H04N 21/812* (2013.01); *H04N 21/8173* (2013.01); *H04N 21/84* (2013.01); *H04N 21/858* (2013.01)

(56) References Cited

U.S. PATENT DOCUMENTS

| | | |
|---|---|---|
| 5,437,050 A | 7/1995 | Lamb et al. |
| 5,712,995 A | 1/1998 | Cohn |
| 5,874,686 A | 2/1999 | Ghias et al. |
| 5,918,223 A | 6/1999 | Blum et al. |
| 5,956,683 A | 9/1999 | Jacobs et al. |
| 5,991,737 A | 11/1999 | Chen |
| 6,121,530 A | 9/2000 | Sonoda |
| 6,184,877 B1 | 2/2001 | Dodson et al. |
| 6,201,176 B1 | 3/2001 | Yourlo |
| 6,314,577 B1 | 11/2001 | Pocock |
| 6,408,272 B1 | 6/2002 | White et al. |
| 6,504,089 B1 | 1/2003 | Nagasawa et al. |
| 6,556,218 B1 | 4/2003 | Alcorn |
| 6,760,720 B1 | 7/2004 | De Bellis |
| 6,765,595 B2 | 7/2004 | Lee et al. |
| 6,834,308 B1 | 12/2004 | Ikezoye et al. |
| 6,968,337 B2 | 11/2005 | Wold |
| 6,990,453 B2 | 1/2006 | Wang et al. |
| 7,080,325 B2 | 7/2006 | Treibach-Heck et al. |
| 7,095,871 B2 | 8/2006 | Jones et al. |
| 7,134,132 B1 | 11/2006 | Ngo et al. |
| 7,174,293 B2 | 2/2007 | Kenyon et al. |
| 7,190,971 B1 | 3/2007 | Kawamoto |
| 7,194,752 B1 | 3/2007 | Kenyon et al. |
| 7,266,343 B1 | 9/2007 | Yli-juuti et al. |
| 7,363,278 B2 | 4/2008 | Schmelzer et al. |
| 7,444,353 B1 | 10/2008 | Chen et al. |
| 7,500,007 B2 | 3/2009 | Ikezoye et al. |
| 7,529,659 B2 | 5/2009 | Wold |
| 7,562,012 B1 | 7/2009 | Wold et al. |
| 7,562,392 B1 | 7/2009 | Rhoads et al. |
| 7,565,327 B2 | 7/2009 | Schmelzer |
| 7,624,416 B1 | 11/2009 | Vandermolen et al. |
| 7,703,114 B2 | 4/2010 | Thukral |
| 7,707,088 B2 | 4/2010 | Schmelzer |
| 7,711,652 B2 | 5/2010 | Schmelzer |
| 7,730,509 B2 | 6/2010 | Boulet et al. |
| 7,747,749 B1 | 6/2010 | Erikson et al. |
| 7,783,489 B2 | 8/2010 | Kenyon et al. |
| 7,797,249 B2 | 9/2010 | Schmelzer et al. |
| 7,813,954 B1 | 10/2010 | Price et al. |
| 7,870,574 B2 | 1/2011 | Kenyon et al. |
| 7,877,290 B1 | 1/2011 | Arsenault et al. |
| 7,877,438 B2 | 1/2011 | Schrempp et al. |
| 7,900,228 B2 | 3/2011 | Stark et al. |
| 7,917,645 B2 | 3/2011 | Ikezoye et al. |
| 8,006,274 B2 | 8/2011 | Scott, III |
| 8,046,803 B1 | 10/2011 | Lee |
| 8,117,635 B2 | 2/2012 | Hendricks et al. |
| 8,249,422 B2 | 8/2012 | Narahara et al. |
| 8,281,339 B1 | 10/2012 | Walker et al. |
| 8,335,833 B1 | 12/2012 | Parkinson |
| 8,407,750 B2 | 3/2013 | Vorbau |
| 8,413,206 B1 | 4/2013 | Wyatt et al. |
| 8,418,206 B2 | 4/2013 | Bryant et al. |
| 8,484,676 B1* | 7/2013 | Narsimhan ........ H04N 21/4126 348/734 |
| 8,553,148 B2 | 10/2013 | Ramaswamy et al. |
| 8,572,650 B2 | 10/2013 | Townsend et al. |
| 8,732,473 B2 | 5/2014 | Bisso et al. |
| 8,732,739 B2 | 5/2014 | Sillerman |
| 8,738,442 B1* | 5/2014 | Liu .................... G06Q 30/0267 705/14.4 |
| 8,793,274 B2 | 7/2014 | Yu et al. |
| 2002/0032906 A1 | 3/2002 | Grossman |
| 2002/0069100 A1 | 6/2002 | Arberman |
| 2002/0073419 A1 | 6/2002 | Yen et al. |
| 2002/0078441 A1 | 6/2002 | Drake et al. |
| 2002/0083060 A1 | 6/2002 | Wang et al. |
| 2002/0120925 A1 | 8/2002 | Logan |
| 2002/0133817 A1 | 9/2002 | Markel |
| 2002/0178447 A1 | 11/2002 | Plotnick et al. |
| 2003/0002638 A1 | 1/2003 | Kaars |
| 2003/0035075 A1 | 2/2003 | Butler et al. |
| 2003/0055699 A1 | 3/2003 | O'Connor |
| 2003/0056101 A1 | 3/2003 | Epstein |
| 2003/0101451 A1 | 5/2003 | Bentolila et al. |
| 2003/0149975 A1 | 8/2003 | Eldering et al. |
| 2003/0154475 A1 | 8/2003 | Rodriguez et al. |
| 2003/0172381 A1 | 9/2003 | Janevski |
| 2004/0003397 A1 | 1/2004 | Boston et al. |
| 2004/0031046 A1 | 2/2004 | Weinblatt et al. |
| 2004/0034874 A1 | 2/2004 | Hord et al. |
| 2004/0068737 A1 | 4/2004 | Itoh et al. |
| 2004/0143349 A1 | 7/2004 | Roberts et al. |
| 2004/0143845 A1 | 7/2004 | Lin et al. |
| 2004/0189710 A1 | 9/2004 | Goulden et al. |
| 2004/0205810 A1 | 10/2004 | Matheny et al. |
| 2004/0210847 A1 | 10/2004 | Berson et al. |
| 2004/0255322 A1 | 12/2004 | Meadows et al. |
| 2005/0022211 A1 | 1/2005 | Veselov et al. |
| 2005/0097599 A1 | 5/2005 | Plotnick et al. |
| 2005/0149968 A1 | 7/2005 | Konig et al. |
| 2005/0235307 A1 | 10/2005 | Relan et al. |
| 2005/0278731 A1 | 12/2005 | Cameron et al. |
| 2006/0015923 A1 | 1/2006 | Chuah et al. |
| 2006/0026636 A1 | 2/2006 | Stark et al. |
| 2006/0031684 A1 | 2/2006 | Sharma et al. |
| 2006/0187358 A1 | 8/2006 | Lienhart et al. |
| 2006/0195860 A1 | 8/2006 | Eldering et al. |
| 2006/0282847 A1 | 12/2006 | Gupte |
| 2007/0192784 A1 | 8/2007 | Postrel |
| 2007/0250901 A1 | 10/2007 | McIntire et al. |
| 2008/0064490 A1 | 3/2008 | Ellis |
| 2008/0104634 A1 | 5/2008 | Gajdos et al. |
| 2008/0127253 A1 | 5/2008 | Zhang et al. |
| 2008/0227436 A1 | 9/2008 | Gantman et al. |
| 2008/0244640 A1 | 10/2008 | Belleguie |
| 2008/0250447 A1* | 10/2008 | Rowe ................ G06Q 30/02 725/32 |

(56) References Cited

U.S. PATENT DOCUMENTS

| | | |
|---|---|---|
| 2008/0305815 A1 | 12/2008 | McDonough |
| 2008/0310731 A1 | 12/2008 | Stojancic et al. |
| 2008/0313140 A1 | 12/2008 | Pereira et al. |
| 2009/0009532 A1 | 1/2009 | Hallberg |
| 2009/0064261 A1 | 3/2009 | Jung |
| 2009/0077046 A1 | 3/2009 | Narahara et al. |
| 2009/0077489 A1 | 3/2009 | Homma |
| 2009/0094637 A1 | 4/2009 | Lemmons |
| 2009/0106104 A1 | 4/2009 | Upendran et al. |
| 2009/0119723 A1 | 5/2009 | Tinsman |
| 2009/0133049 A1 | 5/2009 | Bradley |
| 2009/0150930 A1 | 6/2009 | Sherwin et al. |
| 2009/0235317 A1 | 9/2009 | Igarashi |
| 2009/0259690 A1 | 10/2009 | Bogdanov |
| 2009/0288113 A1 | 11/2009 | Skinner |
| 2009/0317053 A1 | 12/2009 | Morley et al. |
| 2009/0318114 A1 | 12/2009 | Bertoni |
| 2009/0319522 A1 | 12/2009 | Karstens |
| 2009/0327894 A1 | 12/2009 | Rakib et al. |
| 2010/0007797 A1 | 1/2010 | Stojancic |
| 2010/0043040 A1 | 2/2010 | Olsen, Jr. |
| 2010/0095337 A1 | 4/2010 | Dua |
| 2010/0121691 A1 | 5/2010 | Shifflett et al. |
| 2010/0125498 A1 | 5/2010 | Jaramillo |
| 2010/0158391 A1 | 6/2010 | Cunningham et al. |
| 2010/0162344 A1 | 6/2010 | Casagrande et al. |
| 2010/0169906 A1 | 7/2010 | Takahashi |
| 2010/0175078 A1 | 7/2010 | Knudson et al. |
| 2010/0205627 A1 | 8/2010 | Cesmedziev |
| 2010/0205628 A1 | 8/2010 | Davis et al. |
| 2010/0242065 A1 | 9/2010 | Murakami |
| 2010/0245681 A1 | 9/2010 | Harris |
| 2010/0269128 A1 | 10/2010 | Gordon |
| 2010/0303338 A1 | 12/2010 | Stojancic et al. |
| 2010/0306193 A1 | 12/2010 | Pereira et al. |
| 2010/0318515 A1 | 12/2010 | Ramanathan et al. |
| 2010/0325135 A1 | 12/2010 | Chen et al. |
| 2011/0067046 A1 | 3/2011 | Cox et al. |
| 2011/0067066 A1 | 3/2011 | Barton et al. |
| 2011/0078729 A1 | 3/2011 | Lajoie et al. |
| 2011/0078733 A1 | 3/2011 | Lee |
| 2011/0088063 A1 | 4/2011 | Ben-Romdhane et al. |
| 2011/0107363 A1 | 5/2011 | Sanghavi |
| 2011/0122255 A1 | 5/2011 | Haritaoglu |
| 2011/0177775 A1 | 7/2011 | Gupta et al. |
| 2011/0191806 A1 | 8/2011 | Knudson et al. |
| 2011/0219419 A1 | 9/2011 | Reisman |
| 2011/0280434 A1 | 11/2011 | Mamidwar et al. |
| 2011/0283322 A1 | 11/2011 | Hamano |
| 2011/0283327 A1 | 11/2011 | Zhu |
| 2011/0289098 A1 | 11/2011 | Oztaskent et al. |
| 2011/0289114 A1 | 11/2011 | Yu et al. |
| 2011/0289524 A1 | 11/2011 | Toner et al. |
| 2011/0289532 A1* | 11/2011 | Yu ................... H04N 21/4126 725/38 |
| 2011/0307931 A1* | 12/2011 | Shuster ............ G06F 17/30817 725/105 |
| 2011/0311095 A1 | 12/2011 | Archer |
| 2011/0313856 A1 | 12/2011 | Cohen et al. |
| 2011/0314491 A1 | 12/2011 | Delidais et al. |
| 2011/0314495 A1 | 12/2011 | Zenor |
| 2012/0017236 A1 | 1/2012 | Stafford et al. |
| 2012/0042334 A1 | 2/2012 | Choi et al. |
| 2012/0054848 A1 | 3/2012 | Salowey et al. |
| 2012/0079521 A1 | 3/2012 | Garg et al. |
| 2012/0096491 A1 | 4/2012 | Shkedi |
| 2012/0117584 A1 | 5/2012 | Gordon |
| 2012/0124625 A1 | 5/2012 | Foote et al. |
| 2012/0144416 A1* | 6/2012 | Wetzer ............ H04N 21/25816 725/14 |
| 2012/0167133 A1 | 6/2012 | Carroll et al. |
| 2012/0174157 A1 | 7/2012 | Stinson, III et al. |
| 2012/0185895 A1 | 7/2012 | Wong et al. |
| 2012/0192227 A1 | 7/2012 | Fleischman et al. |
| 2012/0215789 A1 | 8/2012 | Ramanathan et al. |
| 2012/0240151 A1* | 9/2012 | Tapper ............... H04N 21/4104 725/32 |
| 2012/0246693 A1 | 9/2012 | Iqbal |
| 2012/0303442 A1* | 11/2012 | Patwa ............... G06F 17/30905 705/14.41 |
| 2012/0311618 A1 | 12/2012 | Blaxland |
| 2012/0317240 A1 | 12/2012 | Wang |
| 2012/0331496 A1 | 12/2012 | Copertino et al. |
| 2013/0014146 A1 | 1/2013 | Bhatia et al. |
| 2013/0019262 A1 | 1/2013 | Bhatia et al. |
| 2013/0036011 A1* | 2/2013 | Roberts ............. G06Q 30/0251 705/14.58 |
| 2013/0047178 A1 | 2/2013 | Moon et al. |
| 2013/0047180 A1 | 2/2013 | Moon et al. |
| 2013/0125163 A1 | 5/2013 | Chen et al. |
| 2013/0132999 A1 | 5/2013 | Pandey |
| 2013/0162902 A1 | 6/2013 | Musser, Jr. et al. |
| 2013/0163957 A1 | 6/2013 | Ikizyan et al. |
| 2013/0167171 A1 | 6/2013 | Kitazato et al. |
| 2013/0174191 A1 | 7/2013 | Thompson, Jr. et al. |
| 2013/0198768 A1 | 8/2013 | Kitazato |
| 2013/0205315 A1 | 8/2013 | Sinha et al. |
| 2013/0205316 A1 | 8/2013 | Sinha et al. |
| 2013/0205318 A1 | 8/2013 | Sinha et al. |
| 2013/0205319 A1 | 8/2013 | Sinha et al. |
| 2013/0205335 A1 | 8/2013 | Sinha et al. |
| 2013/0208942 A1 | 8/2013 | Davis |
| 2013/0239163 A1 | 9/2013 | Kim et al. |
| 2013/0276010 A1* | 10/2013 | Drayson .......... H04N 21/44222 725/14 |
| 2013/0305335 A1 | 11/2013 | Syed et al. |
| 2013/0332951 A1 | 12/2013 | Gharaat et al. |
| 2013/0339999 A1 | 12/2013 | Sangiovanni et al. |
| 2014/0082659 A1* | 3/2014 | Fife ................. H04N 21/25891 725/32 |
| 2014/0089815 A1 | 3/2014 | Gildfind et al. |
| 2014/0143043 A1* | 5/2014 | Wickramasuriya H04N 21/41407 705/14.45 |
| 2014/0150022 A1* | 5/2014 | Oh ....................... H04N 21/478 725/37 |
| 2014/0164994 A1 | 6/2014 | Myslinski |
| 2014/0173661 A1 | 6/2014 | Yamagishi |
| 2014/0280695 A1* | 9/2014 | Sharma ............... H04L 67/1095 709/217 |
| 2014/0282653 A1* | 9/2014 | Ariantaj ............. H04N 21/2668 725/14 |

* cited by examiner

METHOD AND SYSTEM FOR PROVIDING SYNCHRONIZED ADVERTISEMENTS AND SERVICES

CROSS-REFERENCE TO RELATED APPLICATIONS/INCORPORATION BY REFERENCE

This application makes reference to, claims priority to, and claims the benefit of U.S. Application Ser. No. 61/798,439, which was filed on Mar. 15, 2013.

This application also makes reference to:
U.S. application Ser. No. 14/141,931, which was filed on Dec. 27, 2014;
U.S. application Ser. No. 14/141,972, which was filed on Dec. 27, 2014;
U.S. application Ser. No. 14/142,022, which was filed on Dec. 27, 2014;
U.S. application Ser. No. 14/142,041, which was filed on Dec. 27, 2014;
U.S. application Ser. No. 13/730,352, filed Dec. 28, 2012;
U.S. application Ser. No. 13/730,459, filed Dec. 28, 2012;
U.S. application Ser. No. 13/730,495, filed Dec. 28, 2012;
U.S. application Ser. No. 13/730,530, filed Dec. 28, 2012;
U.S. application Ser. No. 13/730,754, filed Dec. 28, 2012;
U.S. application Ser. No. 13/730,559, filed Dec. 28, 2012;
U.S. application Ser. No. 13/730,579, filed Dec. 28, 2012;
U.S. application Ser. No. 13/730,593, filed Dec. 28, 2012;
U.S. application Ser. No. 13/730,759, filed Dec. 28, 2012;
U.S. application Ser. No. 13/730,627, filed Dec. 28, 2012;
U.S. application Ser. No. 13/730,644, filed Dec. 28, 2012;
U.S. application Ser. No. 13/730,656, filed Dec. 28, 2012;
U.S. application Ser. No. 13/730,670, filed Dec. 28, 2012;
U.S. application Ser. No. 13/730,691, filed Dec. 28, 2012;
U.S. application Ser. No. 13/730,702, filed Dec. 28, 2012;
U.S. application Ser. No. 13/730,718, filed Dec. 28, 2012; and
U.S. application Ser. No. 13/730,734, filed Dec. 28, 2012.

Each of the above referenced application is hereby incorporated herein by reference in its entirety.

FIELD OF THE DISCLOSURE

Certain embodiments of the disclosure relate to communication systems. More specifically, certain embodiments of the disclosure relate to a method and system for providing synchronized advertisements and services.

BACKGROUND OF THE DISCLOSURE

A significant portion of some businesses' revenue is derived from advertisements. The manner in which these advertisements are presented to viewers and the way these viewers interact with and/or perceive the presented advertisements is very important to the success of these businesses.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

A method and system for providing synchronized advertisements and services, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Figure 1:
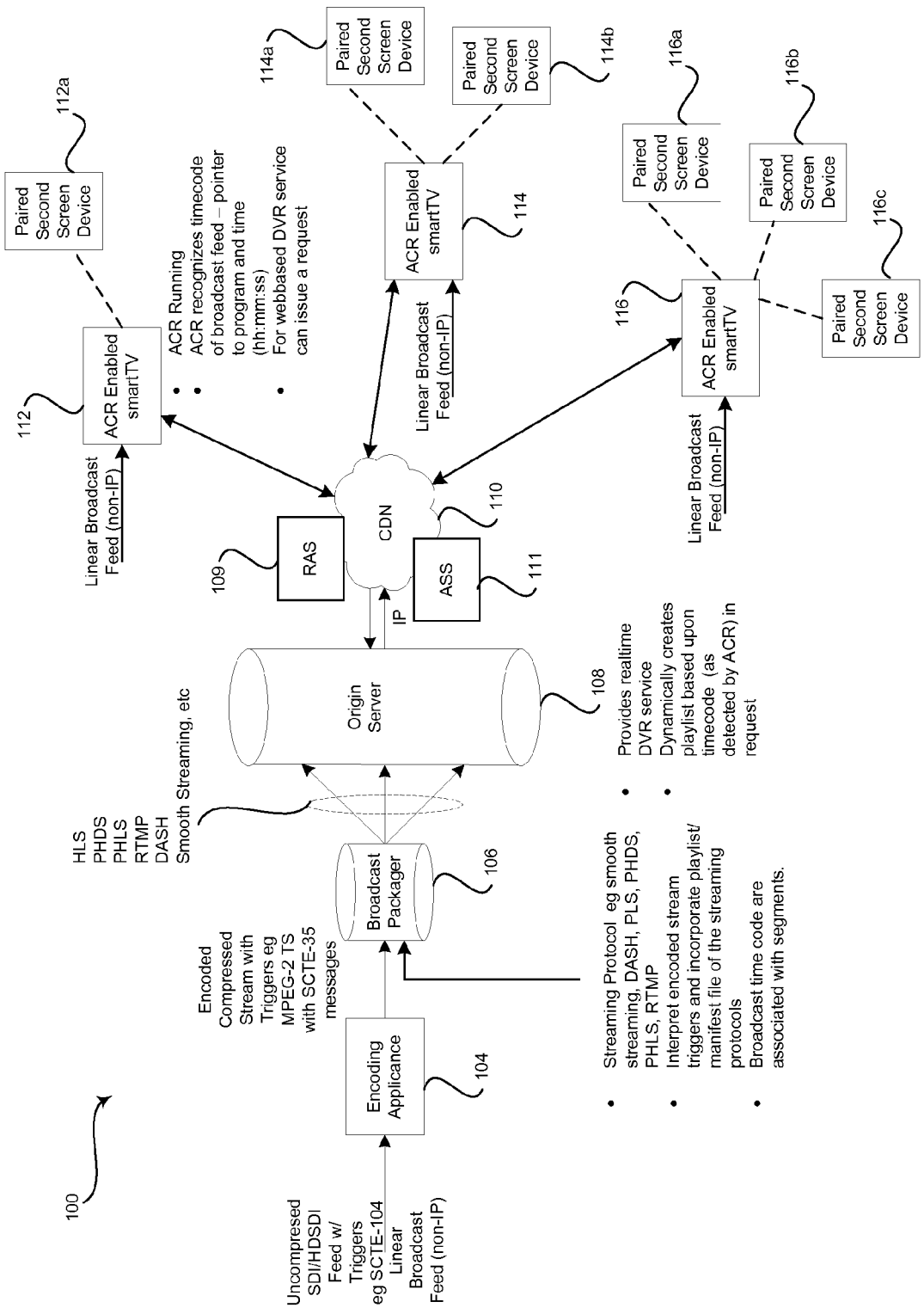
FIG. 1 is a diagram that illustrates an exemplary system for automatic content recognition (ACR) integration for smart-TVs and mobile communication devices, in accordance with an exemplary embodiment of the disclosure.

Certain embodiments of the disclosure may be found in a method and system for providing synchronized advertisements and services. In various exemplary embodiments of the disclosure, a second screen communication device that is paired with an automatic content recognition (ACR) enabled display communication device is operable to detect presentation of a linear advertisement campaign on the automatic content recognition enabled display communication device and control presentation of content, which is associated with the linear advertisement campaign, on the second screen communication device. The content that is associated with the linear advertisement campaign comprises a plurality of messages. The second screen communication device is operable to select one or more of the plurality of messages for presentation on the second screen communication whenever the linear advertisement campaign is detected during the presentation on the automatic content recognition enabled display communication device. The screen communication device may be operable to sequence through presentation of the plurality of messages on the automatic content recognition enabled display communication device based on the selection.

The second screen communication device may be operable to track a frequency at which one or more of the plurality of messages is presented on the second screen communication device. The content associated with the one or more of the plurality of messages may be presented on the second screen communication device if the frequency of one or more of the plurality of messages is less than a particular threshold value. The second screen communication device may be operable to bar presentation of the content associated with one or more of the plurality of messages if the frequency of one or more of the plurality of messages is greater than the particular threshold value.

The second screen communication device may be operable to determine which one of a plurality of segments of the linear advertisement campaign is being presented on the second screen communication device. The second screen communication device may be operable to present content corresponding to the determined one of the plurality of segments on the second screen communication device.

The second screen communication device may be operable to determine one or more attributes that enables the presentation of the content that is associated with the linear advertisement campaign on the second screen communication device and compare the determined one or more attributes to one or more attributes associated with one or more products and/or services provided by advertiser of the linear advertisement campaign. The second screen communication device may be operable to present information on the second screen communication device that enables a viewer of the second screen communication device to utilize the one or more products and/or services provided by the advertiser of the linear advertisement campaign.

FIG. 1 is a diagram that illustrates an exemplary system for automatic content recognition integration for smartTVs and mobile communication devices, which may provide synchronized advertisements and services, in accordance with an exemplary embodiment of the disclosure. Referring to FIG. 1, there is shown a exemplary system for automatic content recognition integration for smartTVs and mobile communication devices 100 comprising an encoding appliance 104, a broadcast packager 106, an origin server 108, a reference advertisement server (RAS) 109, a content delivery network (CDN) 110, an advertisement synchronization server (ASS) 111, a plurality of ACR-enabled smartTVs 112, 114, 116 and a plurality of paired second screen communication devices 112a, 114a, 114b, 116a, 116b, 116c.

The encoding appliance 104 may comprise suitable logic, circuitry, interfaces and/or code that may be operable to encode a received feed into one or more encoded formats and accordingly generate one or more corresponding output encoded feeds. The encoding appliance 104 may be operable to receive an uncompressed (high definition) serial digital interface (HDSDI) protocol feed, which may comprise embedded metadata triggers that can include frame accurate declarations of advertisement and program time boundaries. The uncompressed (high definition) serial digital interface (HDSDI) protocol feed comprises a linear broadcast feed and as such, is a non-Internet Protocol (non-IP) feed or stream. In an exemplary embodiment of the disclosure, the serial digital interface (SDI/HDSDI) protocol feed may comprise a SCTE-104 SDI protocol feed. SCTE-104 is a standardized metadata insertion specification that may be utilized to declare digital insertion points of program and advertisement content in high definition (HD) SDI streams. SCTE-104 enables the insertion of advertisements (commercials) and custom content such as the ACR-based triggers and assets in the HD SDI broadcast stream. The encoding appliance 104 may be operable to encode the received linear broadcast feed and generate an encoded compressed stream with content triggers translated from the broadcast SCTE-104 messages. In an exemplary embodiment of the disclosure, the encoding appliance 104 may be operable to encode the received linear broadcast feed and generate an MPEG-2 transport stream (TS) with SCTE-35 messages. SCTE-35 is a standardized advertisement insertion specification that is utilized to define, for example, cue and insertion points in MPEG-2 transport streams.

The broadcast packager 106 may comprise suitable logic, circuitry, interfaces and/or code that may be operable to receive the encoded compressed stream with the SCTE-35 triggers and packages the content in one or more IP based web delivery formats. In an embodiment of the disclosure, the broadcast packager 106 may be operable to package at least a portion of the encoded compressed stream with the SCTE-35 triggers into streaming or segmented streaming protocol formats. Exemplary streaming or segmented streaming protocol formats may comprise, for example, hypertext transport protocol (HTTP) Live Streaming (HLS) format, Microsoft smooth streaming, Dynamic Adaptive Streaming over HTTP (DASH) (also referred to as MPEG-DASH), Protected HTTP Dynamic Streaming (PHDS), Protected HTTP Live Streaming (PHLS), and real time messaging protocol (RTMP). The broadcast packager 106 may be operable to interpret the encoded stream triggers and incorporate playlists and/or manifests file for the streaming protocols. The broadcast packager 106 may also be operable to handle the processing and insertion of broadcast time codes as obtained from an internal system clock or external NTP (Network Time Protocol) based source into the packaged content for the various broadcast stream formats. In the case of segmented streaming protocols (e.g., HLS, DASH, Microsoft Smooth Streaming, and HDS/pHDS) the packager may use broadcast timecodes as part of the naming convention of the stream 'chunks' so as to enable DVR playback via dynamic playlist creation. The packaged content for the various broadcast stream formats generated by the broadcast packager 106 may comprise one or more IP-based digital streams.

The origin server 108 may comprise suitable logic, circuitry, interfaces and/or code that may be operable to store the packaged content for the various IP-based broadcast stream formats. The origin server 108 may also be operable to post assets (e.g. IP-based version of the asset with corresponding metadata declarations in the manifest files) to one or more servers or storage devices within the content delivery network 110. The assets may comprise, for example, graphics, banners, overlays, text, audio, video and so on, which may be utilized by the ACR-enabled smartTVs 112, 114, 116. As noted in the diagram, the origin server 108 may also be operable to provide a real time DVR service via dynamic playlist creation based upon start and stop timecodes in the request. This may also be provided by the content delivery network 110.

The content delivery network 110 may comprise suitable logic, circuitry, interfaces and/or code that may be operable to deliver IP-based content from the origin server 108 to each of the ACR-enabled smartTVs 112, 114, 116. Although not shown, the content delivery network 110 may comprise one or more servers, store devices, switches, transport devices and medium that enables delivery of the IP-based content from the origin server 108 to the ACR-enabled smartTVs 112, 114, 116. In an embodiment of the disclosure, the content delivery network 110 may comprise a cloud-based content delivery network. The content delivery network 110 may be operable to handle storage and/or distribution of the assets that may be posted from the origin server 108. The content delivery network 110 may be operable to handle communication and/or distribution of the assets, which may comprise, for example, graphics, banners, overlays, text, audio and/or video to the ACR-enabled smartTVs 112, 114, 116. It may be operable to provide a dynamic DVR service as mentioned above.

The reference advertisement server (RAS) 109 may comprise suitable logic, circuitry, interfaces and/or code that may be operable to store information and/or assets, for non-ACR events, for one or more advertisement campaigns. In this regard, when non-ACR events occur, one or more of the paired second screen communication devices 112a, 114a, 114b, 116a, 116b, 116c may be operable to acquire the corresponding assets for a particular advertisement campaign from the reference advertisement server 109. The acquired corresponding assets for a particular advertisement campaign may be utilized for message sequencing for synchronized advertisements, advertisement frequency capping, advertisement highlighting and/or offering of products and/or services based on interaction with advertisements.

The advertisement synchronization server (ASS) 111 may comprise suitable logic, circuitry, interfaces and/or code that may be operable to store information regarding the assets, for ACR events, for one or more advertisement campaigns. In this regard, when ACR events occur, one or more of the paired second screen communication devices 112a, 114a, 114b, 116a, 116b, and/or 116c may be operable to determine the corresponding information regarding the assets that are to be utilized for a particular advertisement campaign from the advertisement synchronization server 111. Once the corresponding information for the asset for the particular advertisement campaign is determined, the paired second screen communication devices 112a, 114a, 114b, 116a, 116b, and/or 116c may be operable to utilize the determined information to acquire the assets, which are to be utilized for the advertisement campaign, from the reference advertisement server (RAS) 109. The acquired corresponding assets for a particular advertisement campaign may be utilized for message sequencing for synchronized advertisements, advertisement frequency capping, advertisement highlighting and/or offering of products and/or services based on interaction with advertisements.

Each of the plurality of ACR-enabled smartTVs 112, 114, 116 may comprise suitable logic, circuitry, interfaces and/or code that may be operable to consume content from a linear broadcast feed. Each of the plurality of ACR-enabled smartTVs 112, 114, 116 may be operable to receive IP-based broadcast content from the origin server 108 and/or Internet based multimedia content, which may be delivered via the content delivery network 110. Each of the ACR-enabled smartTVs 112, 114, 116 may be operable to handle automatic content recognition for the delivered broadcast content.

The ACR-enabled smartTVs 112, 114, 116 may comprise connected TVs with paired devices such as tablets, and second screen communication devices such as Smartphones and tablets, for example. The ACR-enabled smartTVs 112, 114, 116 may be referred to as viewer devices, for example. Since an ACR system may comprise a plurality of fingerprint match systems, each of which supports a different ACR or fingerprint technology, the ACR-enabled smartTVs 112, 114, 116 that support a particular fingerprint technology are operable to communicate with a compatible corresponding fingerprint match system. Moreover, when a secondary or paired device, for example, the paired second screen communication devices 112a, 114a, 114b, 116a, 116b, 116c, supports a particular fingerprint technology, the secondary or paired device may also be operable to communicate with the corresponding fingerprint match system that supports the compatible fingerprint technology. U.S. application Ser. No. 13/730,352, which was filed on Dec. 28, 2012 discloses a fingerprint match system and is hereby incorporated herein by reference in its entirety. An abstraction layer may refer to, for example, the ability of an ACR system to assign the same event identifiers to different sets of video fingerprints that are generated by different video fingerprint technologies. That is, by appropriately timing the assignment of event identifiers to multiple sequences of video fingerprints that are generated from the same video content but with different video fingerprinting technologies, a single ACR system is able to support video fingerprinting technologies from multiple vendors. This approach allows the ACR system to be both flexible and scalable with respect to fingerprint technology vendors. Interactive event identifiers may be utilized in a television system and/or in a web system to trigger interactive events. When an ACR event is triggered in one of the ACR-enabled smartTVs 112, 114, 116, an invitation may be provided to one or more of the plurality of paired second screen communication devices 112a, 114a, 114b, 116a, 116b, 116c, which enables secondary content associated with the delivered broadcast to be consumed by one or more of the plurality of paired second screen communication devices 112a, 114a, 114b, 116a, 116b, 116c. For example, an ACR event may be triggered in the ACR-enabled smartTV 114 while delivered linear broadcast content is being consumed and presented by the ACR-enabled smartTV 114 and an invitation or notification may be displayed on the ACR-enabled smartTV 114 and/or provided to the paired second screen communication device 114b. The invitation or notification may indicate that corresponding secondary content associated with the delivered linear broadcast content being consumed by the ACR-enabled smartTVs 114 may be available for consumption by the paired second screen communication device 114b.

Each of the plurality of paired second screen communication devices 112a, 114a, 114b, 116a, 116b, 116c may comprise suitable logic, circuitry, interfaces and/or code that may be operable to handle the consumption of multimedia content. Each of the paired second screen communication devices 112a, 114a, 114b, 116a, 116b, 116c may comprise mobile communication devices. A second screen communication device, which may be paired with one or more of the ACR-enabled smartTVs, may be operable to handle consumption of secondary content associated with the delivered broadcast that is consumed by one or more of the plurality of paired second screen communication devices. The second screen communication device 112a may be paired with the ACR-enabled television 112. The second screen communication devices 114a, 114b may be paired with the ACR-enabled television 114. The second screen communication devices 116a, 116b, 116c may be paired with the ACR-enabled television 116. A second screen communication device, which may be paired with an ACR-enabled smartTV, may be operable to receive an indication that secondary content, which may be associated with the delivered broadcast being consumed by the ACR-enabled smartTV, may be available for consumption by the second screen communication device. For example, the second screen communication device 112a may be operable to receive an indication or notification when secondary content associated with the delivered broadcast being consumed by the ACR-enabled smartTV 112, may be available for consumption by the second screen communication device 112a. The indication may comprise an audio and/or visual notification. In this regard, the indication or notification may comprise one or more tones, a banner, a pop-up window, an animation, a short message service (SMS) alert, an audio and/or visual message, and/or other type of notification.

In operation, a viewer may be consuming broadcast content that is being delivered to and presented on the ACR-enabled smartTV 116 via a linear broadcast feed. An ACR event may be triggered during consumption and/or presentation of the broadcast content in the ACR-enabled smartTV 116. The triggered ACR event may cause the generation of an invitation or notification on the ACR-enabled smartTV 116 and/or on one or both of the paired second screen communication devices 116a, 116b. The invitation or notification may indicate that corresponding secondary content associated with the delivered broadcast content being consumed by the ACR-enabled smartTVs 116 may be available for consumption by the paired second screen communication devices 116a, 116b and/or 116c. The viewer may acknowledge the notification on the paired second screen communication device 116a in order to initiate consumption of the secondary content on the paired second screen communication device 116a. The viewer may optionally defer consumption of the secondary content on the paired second screen communication device 116a or the paired second screen communication device 116b until a subsequent time. In accordance with some embodiments of the disclosure, two viewers may be operable to utilize corresponding versions of the paired second screen communication devices 116a, 116b to concurrently consume the secondary content and may share the same viewer experience (e.g. multiplayer game, poll, collaborative gaming, trivia, etc.). In accordance with some embodiments of the disclosure, two viewers may be operable to utilize corresponding versions of the paired second screen communication devices 116a, 116b to independently consume the secondary content and may have the same viewer experience or different viewer experiences.

In accordance with various embodiments of the disclosure, the system for automatic content recognition integration for smartTVs and mobile communication devices 100 is operable to generate one or more IP-based digital streams that corresponds to a linear feed or linear broadcast feed. The generation of the IP-based digital streams may not necessarily be part of the automatic content recognition system. Accordingly, the IP-based digital streams may simply be part of the IP based versions of the broadcast stream. In general, the linear feed or linear broadcast feed may be a non-IP based feed. However, in some systems, the linear feed or linear broadcast feed may be an IP based feed. Accordingly, the linear feed or linear broadcast feed may be generically referred to as a live feed, which may be delivered by the multi-channel video programming distributor (MVPD), which is described with respect to, for example, FIG. 2. In instances when the viewer may be consuming the secondary content on a paired second screen communication device, it may be desirable for the viewer to return to consuming the broadcast content in the linear feed at the point where they were invited to interact with the secondary content. In this regard, the system for automatic content recognition integration for smartTVs and mobile communication devices 100 may switch from providing the broadcast content via the linear feed to providing the corresponding content via an IP-based digital stream whose source may be the content provider, the multi-channel video programming distributor (MVPD), which is described with respect to, for example, FIG. 2, and/or a third party.

Figure 2:
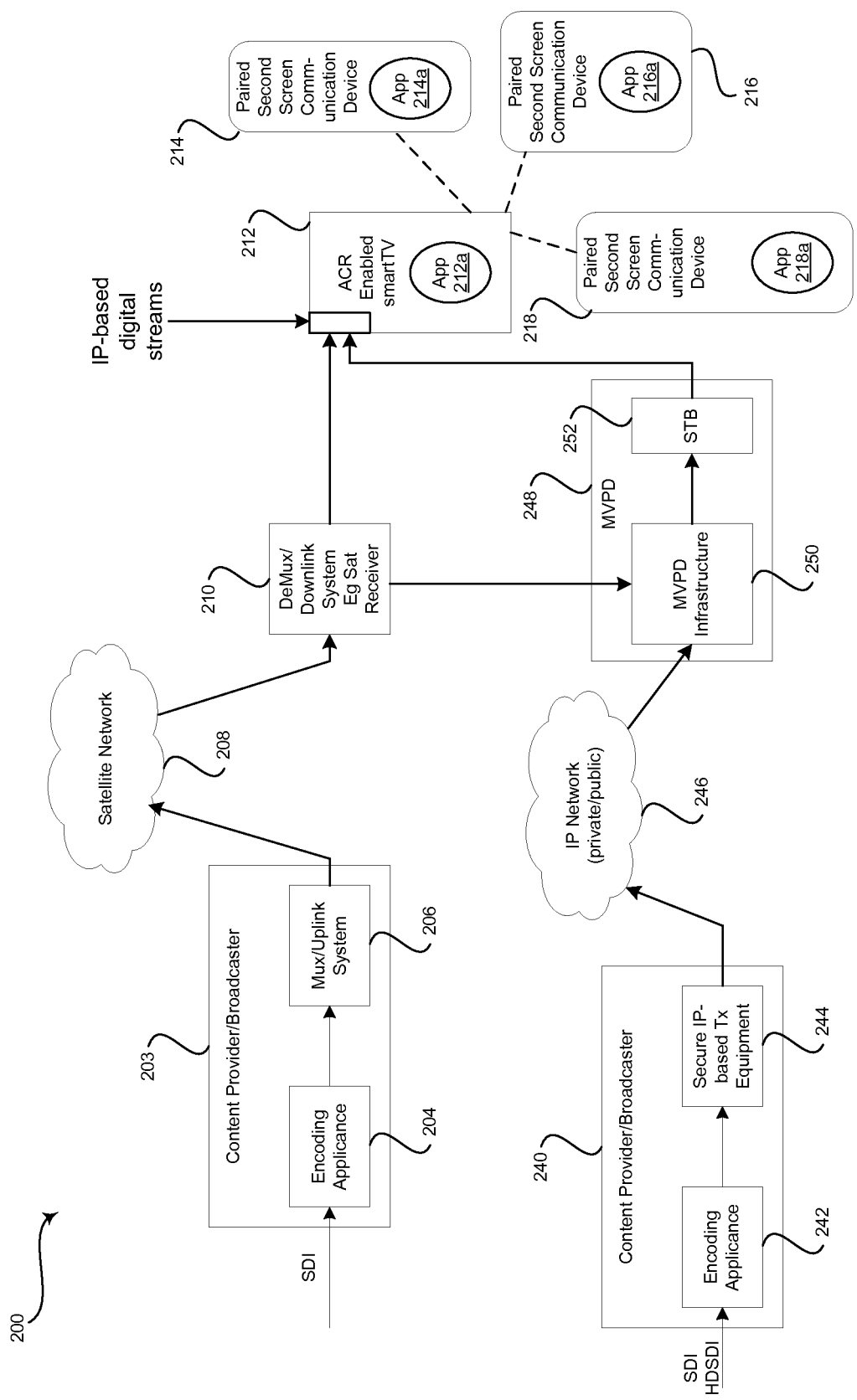
FIG. 2 is a diagram that illustrates an exemplary system for automatic content recognition (ACR) integration for smart-TVs and mobile communication devices, which utilizes a plurality of broadcast feeds, in accordance with an exemplary embodiment of the disclosure.

FIG. 2 is a diagram that illustrates an exemplary system for automatic content recognition (ACR) integration for smartTVs and mobile communication devices, which utilizes a plurality of satellite broadcast feeds, in accordance with an exemplary embodiment of the disclosure. Referring to FIG. 2, there is shown a system for automatic content recognition (ACR) integration for smartTVs and mobile communication devices 200, which utilizes a satellite broadcast feed. The system for automatic content recognition (ACR) integration for smartTVs and mobile communication devices 200 comprises a content provider/broadcaster 203, a satellite network 208, a content provider/broadcaster 240, and IP network 246, a multichannel video programming distributor (MVPD) 248, an ACR-enabled smartTV 212, and a plurality of paired second screen communication devices 214, 216, 218. The content provider/broadcaster 203 comprises an encoding appliance 204, and a multiplexer (mux) and uplink system 206. The content provider/broadcaster 240 comprises an encoding appliance 242, and secure IP-based transmission equipment 244. The MVPD 240 may comprise an MVPD infrastructure 250 and a set-top box (STB) 252. The system for automatic content recognition (ACR) integration for smartTVs and mobile communication devices 200, which utilizes a satellite broadcast feed is operable to deliver a linear broadcast feed to one or more ACR-enabled smartTVs such as the ACR-enabled smartTV 212.

The content provider/broadcaster 203 may be operable to generate content, which may be delivered to the ACR-enabled smartTV 212 via the satellite network 208.

The encoding appliance 204 may comprise suitable logic, circuitry, interfaces and/or code that may be operable to encode a received feed into one or more encoded formats and accordingly generate one or more corresponding output encoded feeds. The encoding appliance 204 may be operable to receive an uncompressed (high definition) serial digital interface (HDSDI) protocol feed, which may comprise embedded metadata triggers that can include frame accurate declarations of advertisement and program time boundaries. The uncompressed (high definition) serial digital interface (HDSDI) protocol feed comprises a linear broadcast feed and as such, is a non-Internet Protocol (non-IP) feed or stream. In an exemplary embodiment of the disclosure, the serial digital interface (SDI/HDSDI) protocol feed may comprise a SCTE-104 SDI protocol feed. SCTE-104 is a standardized metadata insertion specification that may be utilized to declare digital insertion points of program and advertisement content in high definition (HD) SDI streams. The encoding appliance 204 may be operable to encode the received linear broadcast feed and generate an encoded compressed stream with content triggers translated from the broadcast SCTE-104 messages. In an exemplary embodiment of the disclosure, the encoding appliance 104 may be operable to encode the received linear broadcast feed and generate an MPEG-2 transport stream (TS) with SCTE-35 messages. The encoding appliance 204 may be substantially similar to the encoding appliance 104, which is shown and described with respect to FIG. 1.

The multiplexer and uplink system 206 may comprise suitable logic, circuitry, interfaces and/or code that may be operable to receive the encoded output feeds from the encoding appliance 204 and multiplex them into a multiplexed encoded feed for communication to the satellite network 208. In accordance with an embodiment of the disclosure, the multiplexer and uplink system 206 may comprise, for example, a satellite headend. It should be noted that in some embodiments of the disclosure, a content provider's live broadcast stream may be delivered directly via an IP based connection to the multi-channel video programming distributor (MVPD), which is described with respect to, for example, FIG. 2, directly.

The satellite network 208 may comprise one or more satellites that may be operable to receive the multiplexed encoded feed from the multiplexer and uplink system 206 and broadcast the corresponding content via one or more downlink satellite channels. In this regard, the satellite network 208 may comprise suitable logic, circuitry, interfaces, devices and/or code that may be operable to receive the multiplexed encoded feed from the multiplexer and uplink system 206 and broadcast the corresponding content via one or more downlink satellite RF channels.

The demultiplexer and downlink system 210 may comprise suitable logic, circuitry, interfaces and/or code that may be operable to receive and demodulate the one or more downlink satellite RF channels comprising the multiplexed encoded feed. The output from the demultiplexer and downlink system 210 may be communicated to the ACR-enabled smartTV, which may be operable to tune to and decrypt the one or more downlink satellite RF channels. The output from the demultiplexer and downlink system 210 may also be communicated to the multichannel video programming distributor 248, which may be a radio frequency (RF), an intermediate frequency (IF), satellite, cable, and/or IP based distribution system. In this regard, the demultiplexer and downlink system 210 may be operable to communicate one or more corresponding demodulated downlink satellite RF channels to the multichannel video programming distributor 248, which may distribute and deliver live linear broadcast content, through the multichannel video programming distributor infrastructure 250, to the ACR-enabled smartTV 212 via the set-top box 252.

The ACR-enabled smartTV 212 may comprise suitable logic, circuitry, interfaces and/or code that may be operable to consume the live linear feed of the broadcast content from the DeMUX/Downlink system 210 and/or Internet based multimedia content, which may be delivered via the satellite network 208. The ACR-enabled smartTV 212 may also be operable to consume live linear feed of the broadcast content from the set-top box 252, and/or Internet based multimedia content, which may be delivered via the IP network 246. The ACR-enabled smartTV 212 may be operable to handle automatic content recognition for the delivered broadcast content. The ACR-enabled smartTV 212 may be substantially similar to each of the ACR-enabled smartTVs 112, 114, 116, which are shown and described with respect to FIG. 1.

Each of the plurality of paired second screen communication devices 214, 216, 218 may comprise suitable logic, circuitry, interfaces and/or code that may be operable to handle the consumption of multimedia content. Each of the plurality of paired second screen communication devices 214, 216, 218 may comprise mobile communication devices and may be paired with the ACR-enabled smartTV 212. In this regard, each of the plurality of paired second screen communication devices 214, 216, 218, which may be paired with the ACR-enabled smartTV 212, may be operable to consume and interact with secondary content associated with the linear delivered broadcast content, which is being consumed by the ACR-enabled smartTV 212. The paired second screen communication devices 214, 216, 218 may be paired with the ACR-enabled smartTV 212. Each of the plurality of paired second screen communication devices 214, 216, 218 may be substantially similar to the paired second screen communication devices 116a, 116b, 116c, which are disclosed and described with respect to FIG. 1.

One or more of the plurality of paired second screen communication devices 214, 216, 218 may be operable to receive an indication that secondary content, which may be associated with the linear delivered broadcast content being consumed by the ACR-enabled smartTV 212, may be available for consumption by the paired second screen communication device. For example, one or more of the plurality of paired second screen communication devices such as the second screen communication device 214 may be operable to receive an indication or notification when secondary content associated with the linear delivered broadcast being consumed by the ACR-enabled smartTV 212, may be available for consumption by the second screen communication device 214.

Each of the plurality of paired second screen communication devices 214, 216, 218 may comprise an application (app), which is operable to handle the notification, communication and interaction with the secondary content that is associated with the linear delivered broadcast content being consumed by the ACR-enabled smartTV 212. In this regard, the paired second screen communication device 214 may comprise an application 214a, the paired second screen communication device 216 may comprise an application 216a and the paired second screen communication device 218 may comprise an application 218a. The applications 214a, 216a, 218a may be operable to receive a signal or message, which serves as an indication or notification that the secondary content associated with the delivered broadcast being consumed by the ACR-enabled smartTV 212 is available for presentation on the corresponding paired second screen communication devices 214, 216, 218. The applications 214a, 216a, 218a running on the paired second screen communication devices 214, 216, 218 may comprise an application, which runs on top of an operating system of the corresponding paired second screen communication devices 214, 216, 218 or an application which may be integrated as part of an operating system of the corresponding paired second screen communication devices 214, 216, 218. The applications 214a, 216a, 218a may run in the background or may be activated when the secondary content associated with the delivered broadcast being consumed by the ACR-enabled smartTV 212 is available. The applications 214a, 216a, 218a may comprise a user interface that may be operable to generate and/or display one or more control elements such as buttons, icons, visual aids and/or audio aids that enables interaction with the secondary content displayed the corresponding paired second screen communication devices 214, 216, 218.

The content provider/broadcaster 240 may be operable to generate content, which may be delivered to the ACR-enabled smartTV 212 via the IP network 246.

The encoding appliance 242 may comprise suitable logic, circuitry, interfaces and/or code that may be operable to encode a received feed into one or more encoded formats and accordingly generate one or more corresponding output encoded feeds. The encoding appliance 242 may be operable to receive an uncompressed (high definition) serial digital interface (HDSDI) protocol feed, which may comprise embedded metadata triggers that can include frame accurate declarations of advertisement and program time boundaries. The uncompressed (high definition) serial digital interface (HDSDI) protocol feed comprises a linear broadcast feed and as such, is a non-Internet Protocol (non-IP) feed or stream. In an exemplary embodiment of the disclosure, the serial digital interface (SDI/HDSDI) protocol feed may comprise a SCTE-104 SDI protocol feed. SCTE-104 is a standardized metadata insertion specification that may be utilized to declare digital insertion points of program and advertisement content in high definition (HD) SDI streams. The encoding appliance 204 may be operable to encode the received linear broadcast feed and generate an encoded compressed stream with content triggers translated from the broadcast SCTE-104 messages. In an exemplary embodiment of the disclosure, the encoding appliance 242 may be operable to encode the received linear broadcast feed and generate an MPEG-2 transport stream (TS) with SCTE-35 messages. The encoding appliance 242 may be substantially similar to the encoding appliance 104, which is shown and described with respect to FIG. 1.

The secure IP-based transmission equipment 244 may comprise suitable logic, interfaces, and/or code that may be operable to receive secure the generated MPEG-2 transport stream (TS) with SCTE-35 messages, which are received from the encoding appliance 242. In this regard, the secure IP-based transmission equipment 244 may be operable to encrypt the content from the encoding appliance 242, which comprises the MPEG-2 transport stream (TS) with SCTE-35 messages, so that it may be securely transported via the IP network 246.

The IP-network 246 may comprise suitable devices and/or interfaces that may be operable to receive content from the content provider/broadcaster 240 and communicate the received content to the multichannel video programming distributor 248. In this regard, the IP-network 246 may be operable to handle the communication of encrypted content, which may be received from the secure IP-based transmission equipment 244, to the multichannel video programming distributor 248.

The multichannel video programming distributor 248 may comprise suitable devices and/or interfaces that may be operable to deliver live linear content to the ACR-enabled smartTV 212 via the set-top box 252. The multichannel video programming distributor 248, may comprise a radio frequency (RF), an intermediate frequency (IF), satellite, cable, and/or IP based distribution system. The MVPD 248 may be operable to receive live linear content from the content provider/broadcaster 240 via the IP network 246. The MVPD 248 may also be operable to receive live linear content from the content provider/broadcaster 203 via the satellite network 208 and the DeMux/Downlink system 210. The MVPD 248 may comprise a MVPD infrastructure 250 and the set-top box (STB) 252.

The multichannel video programming distributor (MVPD) infrastructure 250 may comprise suitable devices and/or interfaces that may be operable to receive live linear content from the content providers/broadcasters 203, 240. In this regard, the MVPD infrastructure 250 may comprise, for example, satellite and/or cable equipment and infrastructure. The MVPD infrastructure 250 may receive live linear content from the satellite network 208 via the DeMux/Downlink system 210, and also from the IP network 246. The MVPD infrastructure 250 may be operable to communicate the received live linear content to the set-top box 252.

The set-top box (STB) 252 may comprise suitable logic, circuitry, interfaces and/or code that may be operable to receive linear content, which may be encrypted for secured, from the MVPD infrastructure 250. The set-top box (STB) 252 may be operable to tune to one or more channels and decrypt the live linear content. The decrypted live linear content may be communicated from the set-top box 252 to the ACR-enabled smartTV 212. The set-top box 252 may comprise a hardware set-top box or a virtual set-top box.

In operation, a viewer may be consuming linear broadcast content that is being delivered to and presented on the ACR-enabled smartTV 212 via the satellite network 208. An ACR event may be triggered during consumption and/or presentation of the linear delivered broadcast content in the ACR-enabled smartTV 212. The triggered ACR event may cause the generation of an invitation or notification on one or both of the paired second screen communication devices 214, 216, 218. The invitation or notification may indicate that corresponding secondary content associated with the delivered linear broadcast content being consumed by the ACR-enabled smartTVs 212 may be available for consumption by the one or more of the plurality of paired second screen communication devices 214, 216, 218. In an exemplary embodiment of the disclosure, the viewer may acknowledge the notification on the paired second screen communication device 214 in order to initiate consumption of the secondary content on the paired second screen communication device 214. The consumption of the delivered linear broadcast content by the ACR-enabled smartTVs 212 may be paused (as observed by the viewer) at about the time the viewer initiates consumption of the secondary content on the paired second screen communication device 214. The viewer may optionally defer consumption of the secondary content on the paired second screen communication device 214 until a subsequent time utilizing the application 214a.

In instances where the viewer has completed interacting with the secondary content on the paired second screen communication device 214, the viewer may resume consumption of the linear broadcast content on the ACR-enabled smartTV 212. The viewer may resume the consumption of the linear broadcast content on the ACR-enabled smartTV 212 to the current point of the linear broadcast. In this regard, the viewer misses out on the content that was presented in the linear broadcast content between the time at which the delivered linear broadcast content was paused on the ACR-enabled smartTV 212 and the time just before resuming consumption of the linear broadcast content on the ACR-enabled smartTV 212. In accordance with various embodiments of the disclosure, the viewer may resume the consumption of the linear broadcast content on the ACR-enabled smartTV 212 to the time at which the delivered linear broadcast content was paused on the ACR-enabled smartTV 212. In this regard the viewer does not miss out on any content that was presented in the linear broadcast content after the time at which the delivered linear broadcast content was paused on the ACR-enabled smartTV 212. The ACR-enabled smartTV 212 may be operable to switch from the linear broadcast content and consume content from a corresponding IP-based digital stream. Once the switch to the corresponding IP-based digital stream occurs, the ACR-enabled smartTV 212 presents the broadcast content from the corresponding time and position at which the delivered broadcast content in the linear feed was paused.

In accordance with some embodiments of the disclosure, two viewers may be operable to utilize corresponding versions or implementations of the paired second screen communication devices 214, 216 to concurrently consume the secondary content and may share the same viewer experience. In accordance with some embodiments of the disclosure, two viewers may be operable to utilize corresponding implementations or versions of the paired second screen communication devices 216, 218 to independently consume the secondary content and may have the same viewer experience or different viewer experiences.

Figure 3:
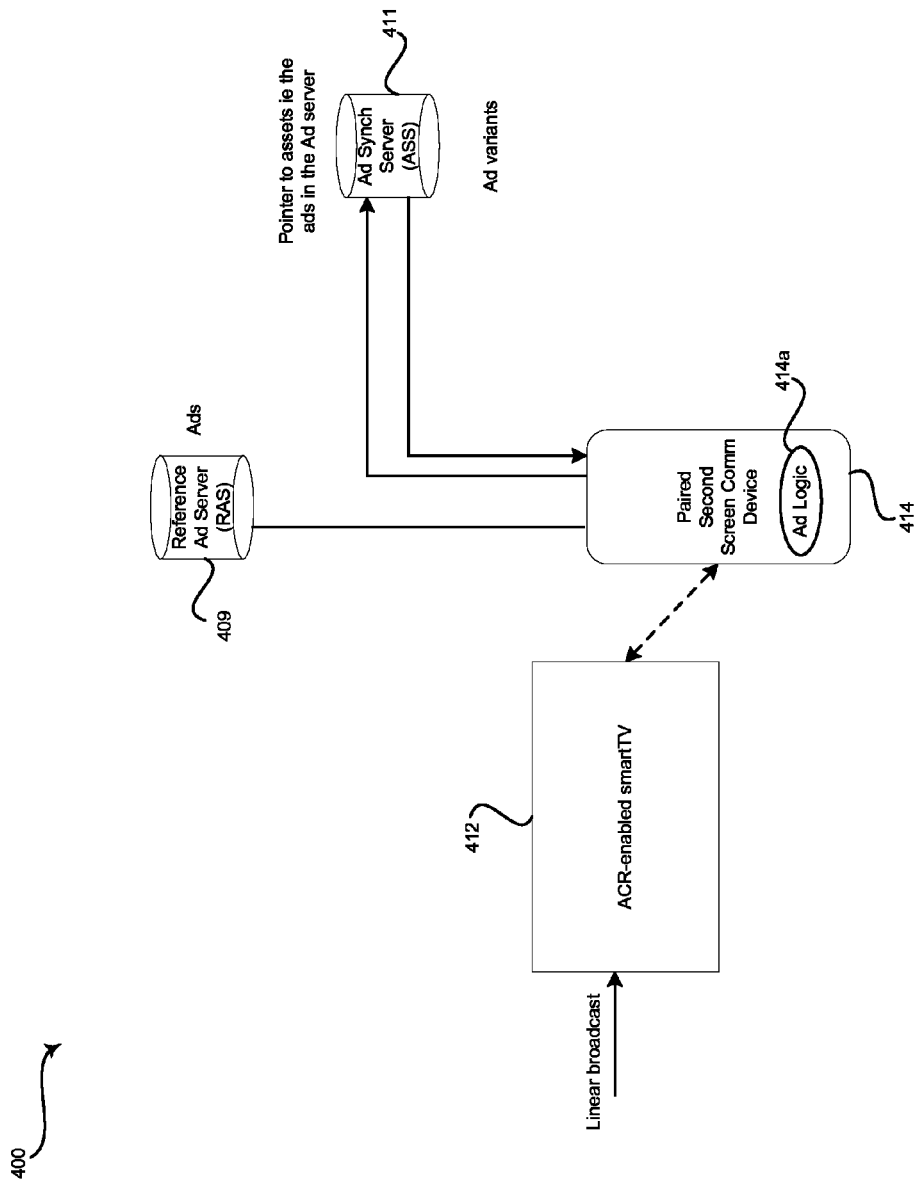
FIG. 3 is a diagram that illustrates an exemplary system for message sequencing for synchronization of advertisements, in accordance with an exemplary embodiment of the disclosure.

FIG. 3 is a diagram that illustrates an exemplary system for message sequencing for synchronization of advertisements, in accordance with an exemplary embodiment of the disclosure. Referring to FIG. 3, there is shown a system for message sequencing for synchronization of advertisements 400. The system for message sequencing for synchronization of advertisements 400 may comprise a reference advertisement Server (RAS) 409, an advertisement synchronization server 411, and ACR-enabled smartTV 412 and a paired second screen communication device 414. It should be recognized that the system is not limited to the usage of an ACR-enabled smart TV, and alternate automatic content recognition techniques using audio recognition and others will provide similar functionality. The paired second screen communication device 414 may comprise an advertisement logic application or module 414a.

The reference advertisement server (RAS) 409 may comprise suitable logic, circuitry, interfaces and/or code that may be operable to store assets, for non-ACR events, for one or more advertisement campaigns. In this regard, when non-ACR events occur, the reference advertisement server 409 may be operable to serve the corresponding assets for a particular advertisement campaign to the paired second screen communication device 414. The acquired corresponding information and/or assets for a particular advertisement campaign may be utilized for message sequencing for synchronized advertisements, advertisement frequency capping and/or advertisement highlighting.

The advertisement synchronization server (ASS) 411 may comprise suitable logic, circuitry, interfaces and/or code that may be operable to store information regarding the assets, for ACR events, for one or more advertisement campaigns. In this regard, when ACR events occur, the paired second screen communication devices 414 may be operable to determine the corresponding information regarding the assets that are to be utilized for a particular advertisement campaign from the advertisement synchronization server 411. Once the corresponding information for the asset for the particular advertisement campaign is determined, the paired second screen communication device 414 may be operable to utilize the determined information to acquire the assets, which are to be utilized for the advertisement campaign, from the reference advertisement server 409. The use of synchronization server 411 enables the entire system to use a third party reference server and decouples the dependency of providing a proprietary Ad server for tasks such as message sequencing, message highlighting etc.

The paired second screen communication device 414 may comprise suitable logic, circuitry, interfaces and/or code that may be operable to display and log synchronized messages for a particular advertisement campaign that is being presented on the ACR-enabled smartTV 412.

The advertisement logic application or module 414a may comprise suitable logic and/or code that may be operable to handle the presentation of content that is representative of the synchronized messages for a particular advertisement campaign that is being presented on the ACR-enabled smartTV 412. The advertisement logic application or module 414a may comprise an application or a software library that may be running on an operating system of the paired second screen communication device 414 or may comprise a module that may be integrated as part of the operating system of the paired second screen communication device 414. The advertisement logic application or module 414a may be operable to handle message sequencing, advertisement frequency capping, advertisement highlighting and/or detection of viewer download speed, this base functionality will enable the application to cater different types advertisements use cases such as an advertisement could persuade a viewer to switch carrier service to obtain higher download speeds The system for message sequencing for synchronization of advertisements 400 may be utilized to step a viewer through the different messages being presented in an advertisement by the advertiser as the advertisement appears on linear and digital devices such as the ACR-enabled smartTV 412 and the paired second screen communication device 414. In this regard, synchronization of advertisement enables the viewer to have a better recall and engagement of the product(s) or service(s) that are being offered by the advertiser in the advertisement. Synchronized advertisement provides an intelligent form of targeting across linear and digital devices.

Figure 4:
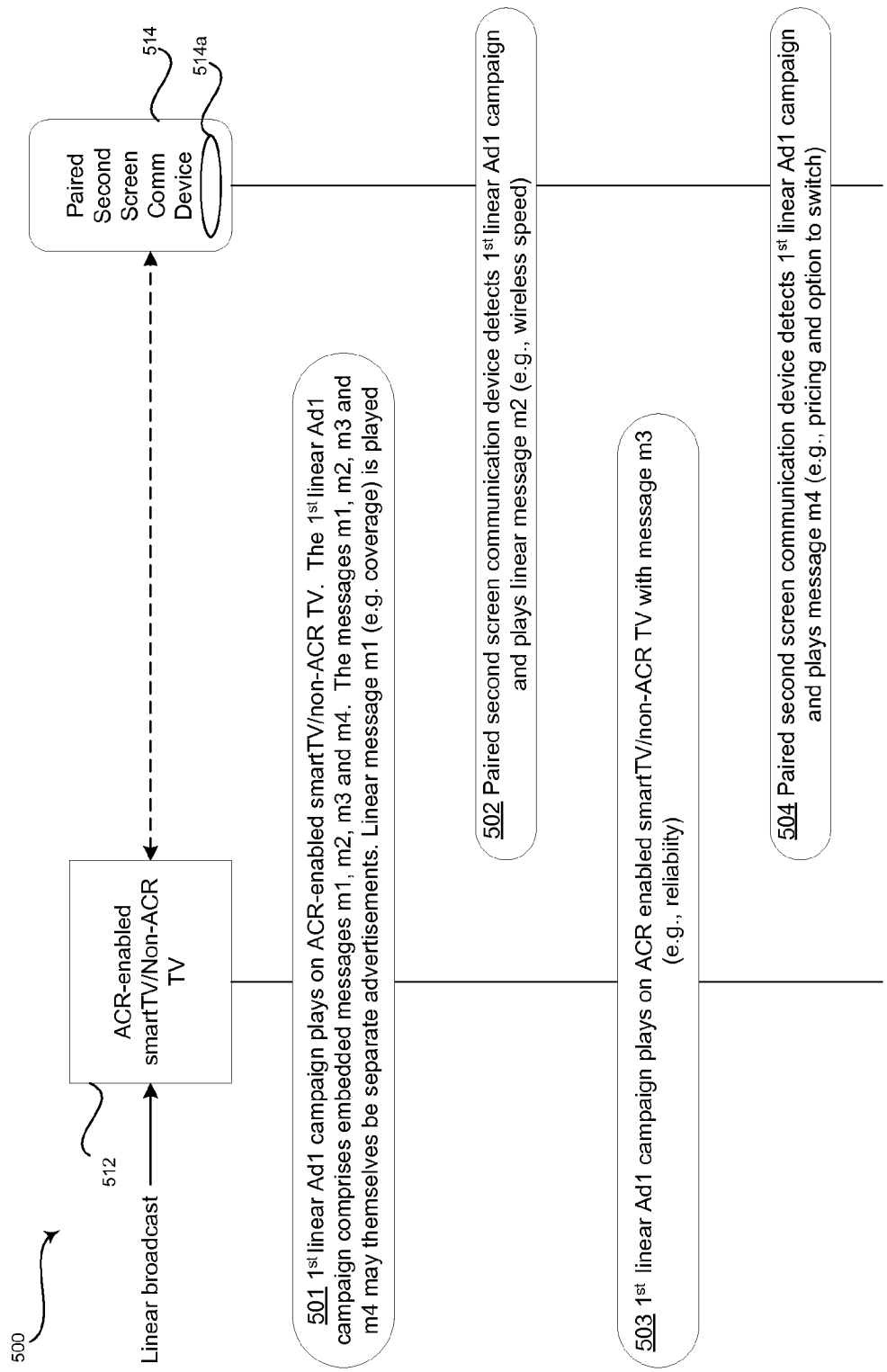
FIG. 4 is a flow diagram that illustrates exemplary message sequencing for synchronized advertisements, in accordance with an exemplary embodiment of the disclosure.

FIG. 4 is a flow diagram that illustrates exemplary message sequencing for synchronized advertisements, in accordance with an exemplary embodiment of the disclosure. Referring to FIG. 4, there is shown exemplary sequencing of messages for synchronized advertisements 500. For the exemplary sequencing of messages for synchronized advertisements 500, there is shown the ACR-enabled smartTV/non-ACR TV 512 and the paired second screen communication device 514 and a plurality of steps 501 through 508.

The paired second screen communication device 514 may comprise an advertisement logic application or module 514a. The paired second screen communication device 514 may be substantially similar to the paired second screen communication device 414, which is illustrated and described with respect to, for example, FIG. 3. The advertisement logic application or module 514a may be substantially similar to the advertisement logic application or module 414a, which is illustrated and described with respect to, for example, FIG. 3.

The ACR enabled smartTV/non-ACR TV 512 is operable to receive a linear broadcast feed. The received linear broadcast feed may comprise a linear advertisement (Ad) campaign, for example, the first linear advertisement (Ad1) campaign. The first linear advertisement (Ad1) campaign may comprise an ACR triggered advertisement or a regular advertisement with no ACR (non-ACR) triggered event. Notwithstanding, the disclosure is not limited in this regard. Accordingly, in some embodiments of the disclosure, the first linear advertisement (Ad1) campaign may comprise some content, which may be ACR triggered and some content which may be non-ACR triggered. For example, a first message (m1) for the first linear advertisement (Ad1) campaign may be ACR-triggered and a second message (m2) for the first linear advertisement (Ad1) campaign may be non-ACR triggered.

In step 501, a first linear advertisement (Ad1) campaign plays on the ACR-enabled smartTV/non-ACR TV 512. The linear Ad1 campaign comprises a plurality of embedded messages m1, m2, m3, m4. In some embodiments of the disclosure, the messages m1, m2, m3, m4 may themselves be one or more advertisements. In an exemplary embodiment of the disclosure, the first linear advertisement (Ad1) campaign may comprise a cellular telephone carrier or wireless service provider advertisement campaign.

In step 502, the paired second screen communication device 514 detects the first linear Ad1 campaign and plays message m2 (which is the message next in sequence, since, m1 is played in a linear manner). The subject matter of the message m1 for linear Ad1 campaign for the cellular telephone carrier or wireless service provider may comprise wireless coverage. The subject matter of the message m2 for linear Ad1 campaign for the cellular telephone carrier or wireless service provider may comprise wireless speed.

In step 503, the first linear advertisement (Ad1) campaign plays on the ACR-enabled smartTV/non-ACR TV 512 and it displays the message m3 The subject matter of the message m2 for linear Ad1 campaign for the cellular telephone carrier or wireless service provider may comprise reliability.

In step 504, the paired second screen communication device 514 detects the first linear (Ad1) campaign and plays message m4. The subject matter of the message m4 for the first linear advertisement (Ad1) campaign for the cellular telephone carrier or wireless service provider may comprise pricing for the various tiers of services being offered. The message m4 may also provide an option to switch. At this moment the viewer has seen all four messages from the Ad1 campaign, two of the messages on ACR-enabled smartTV/non-ACR TV 512 (linear) and two on the paired second screen communication device 514.

For non-ACR events, the paired second screen communication device 514 may access the RAS 409 (FIG. 3) for information and/or assets related to the corresponding messages m1, m2, m3, m4 for the first linear advertisement (Ad1) campaign. In this regard, the paired second screen communication device 514 may go directly to the RAS 409 (FIG. 3) for information and/or assets related to messages m1, m2, m3, m4. The information may specify various options comprising, for example, presentation attributes, timing, frequency, length and/or rules that may be applicable to the presentation of the messages m1, m2, m3, m4. The presentation attributes may specify various visual and/or audio characteristics of the messages m1, m2, m3, m4, which are to be presented on the paired second screen communication device 514. The timing may specify the times at which the messages m1, m2, m3, m4 may be presented on the paired second screen communication device 514. The frequency may specify how often the messages m1, m2, m3, m4 may be presented, which are to be presented on the paired second screen communication device 514. The length may specify how long the messages m1, m2, m3, m4 may be presented, which are to be presented on the paired second screen communication device 514. The rules may specify, for example, any policies and/or conventions that may be followed for presentation of the messages m1, m2, m3, m4 on the paired second screen communication device 514.

For ACR events, the paired second screen communication device 514 may access the ASS 411 (FIG. 3), which may provide a pointer, other indication and/or information to the assets for the messages m1, m2, m3, m4 in the first linear advertisement (Ad1) campaign. For example, the information may specify the different messages that should be sequenced through and the timing and other related sequencing information. The messages that may be sequenced through may be selected from a pool of messages and may be targeted based on, for example, viewer location, view preferences and so on. The paired second screen communication device 514 may utilize the provided pointer, other indication and/or information to request the assets for each of the messages m1, m2, m3, m4 from the RAS 409 (FIG. 3). The RAS 409 (FIG. 3) may deliver the assets to the paired second screen communication device 514.

The advertisement logic application or module 514a on the paired second screen communication device 514 may be operable to control acquisition of the assets for the sequencing of the messages m1, m2, m3, m4. In this regard, the advertisement logic application or module 514a may be operable to acquire the assets for regular advertisements from the reference advertisement server 409 (FIG. 4) and manage and control presentation of the m1, m2, m3, m4 on the paired second screen communication device 514 based in the various corresponding options. For ACR triggered advertisements or messages that comprise ACR triggered events, the advertisement logic application or module 514a may be operable to acquire information from the advertisement synchronization server 411 (FIG. 3) that specifies the assets that are to be utilized. This information is loaded into the synchronization server ahead of any given advertisement campaign (e.g., for Ad1 the registered sequence is m1,m2,m3,m4 and the corresponding advertisement reference server asset keys are k1,k2,k3,k4). Once the advertisement logic application or module 514a acquires the information that specifies the assets that are to be utilized, the advertisement logic application or module 514a may utilize this information to acquire the corresponding assets from the reference advertisement server 409 (FIG. 3). The advertisement logic application or module 514a may be operable to manage and control presentation of the messages m1, m2, m3, m4 on the paired second screen communication device 514. The advertisement logic application or module 514a may be operable to manage and/or control the steps 502, 504, 506 and 508. In this regard, for example, the advertisement logic application or module 514a may be operable to detect the first linear Ad1 campaign and play a corresponding one of the messages m1, m2, m3, m4 based on the options, which may be specified in the information acquired from the advertisement synchronization server 411 (FIG. 3).

Figure 5:
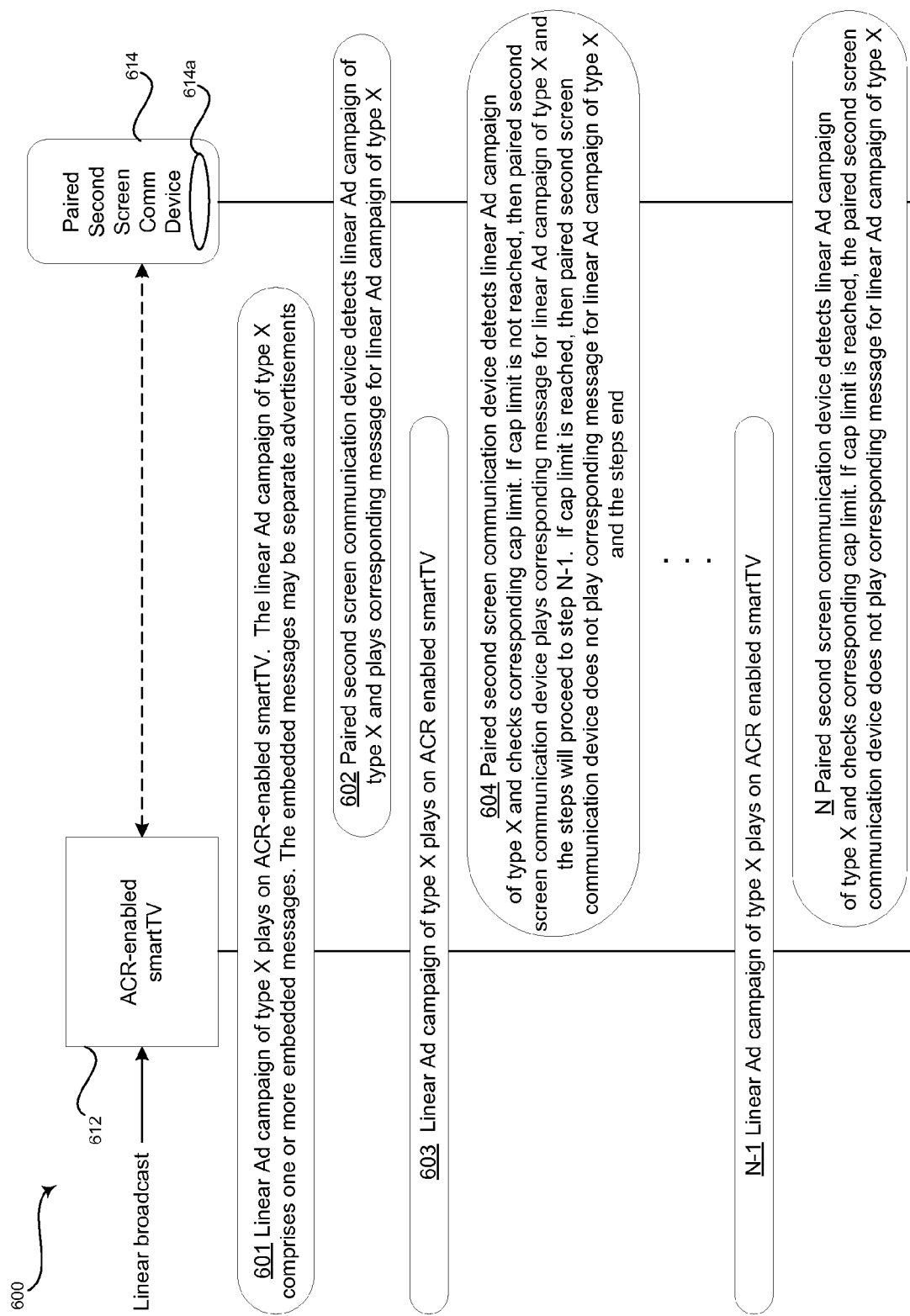
FIG. 5 is a flow diagram that illustrates an exemplary advertisement frequency capping process, in accordance with an exemplary embodiment of the disclosure.

FIG. 5 is a flow diagram that illustrates an exemplary advertisement frequency capping process, in accordance with an exemplary embodiment of the disclosure. Referring to FIG. 5, there is shown an exemplary advertisement frequency capping process 600. For the exemplary advertisement frequency capping process 600, there is shown an ACR-enabled smartTV 612, a paired second screen communication device 614 and a plurality of steps 601, through N. The paired second screen communication device 614 may comprise an advertisement logic application or module 614a. The paired second screen communication device 614 may be substantially similar to the paired second screen communication device 414, which is illustrated and described with respect to, for example, FIG. 3. The advertisement logic application or module 614a may be substantially similar to the advertisement logic application or module 414a, which is illustrated and described with respect to, for example, FIG. 3.

The ACR enabled smartTV 612 is operable to receive a linear broadcast feed. The received a linear broadcast feed may comprise a linear advertisement (Ad) campaign of type X. The linear advertisement campaign of type X may comprise an ACR triggered advertisement or a regular advertisement with no ACR (non-ACR) triggered events. Notwithstanding, the disclosure is not limited in this regard. Accordingly, in some embodiments of the disclosure, a linear advertisement campaign of type X may comprise some content, which may be ACR triggered and some content which may be non-ACR triggered. For example, a first message for the linear advertisement campaign of type X may be ACR-triggered and a second message for the linear advertisement campaign of type X may be non-ACR triggered.

In step 601, the linear Ad campaign of type X plays on the ACR-enabled smartTV 612. The linear Ad campaign of type X may comprise one or more embedded messages, which may comprise ACR triggered content and non-ACR triggered content. In some embodiments of the disclosure, the embedded messages may comprise separate advertisements.

In step 602, the paired second screen communication device 614 detects the linear Ad campaign of type X and plays corresponding message for the linear Ad campaign of type X.

In step 603, the linear Ad campaign of type X plays on the ACR-enabled smartTV 612.

In step 604, the paired second screen communication device 612 detects the linear Ad campaign of type X and checks the corresponding cap limit. If the cap limit is not reached, then the paired second screen communication device 614 plays corresponding message for linear Ad campaign of type X and the steps will proceed to step N−1. If cap limit is reached, then the paired second screen communication device 614 does not play the corresponding message for linear Ad campaign of type X. The steps 603 and 604 may be repeated until the cap limit is reached. This is illustrated in step N−1 and N.

In step N−1, the linear Ad campaign of type X plays on an ACR-enabled smartTV 612.

In step N, the paired second screen communication device 614 detects linear Ad campaign of type X and checks the corresponding cap limit. The cap limit is reached, and the paired second screen communication device 614 does not play the corresponding message for linear Ad campaign of type X.

The paired second screen communication device 614 may be operable to acquire assets for regular advertisements from the reference advertisement server 409 (FIG. 4). Regular advertisements are advertisements, which do not have any ACR events. In other words, regular advertisements are non-ACR triggered advertisements and do not have ACR triggered events.

The paired second screen communication device 614 is operable to acquire information that specifies the assets that are to be utilized for an ACR event triggered advertisement from the advertisement synchronization server 411 (FIG. 3). Once the paired second screen communication device 614 acquires the information that specifies the assets that are to be utilized for the ACR event triggered advertisements from the advertisement synchronization server 411 (FIG. 3), the paired second screen communication device 614 may utilize this information to acquire the corresponding assets from the reference advertisement server 409 (FIG. 3).

In an exemplary embodiment of the disclosure, the advertisement synchronization server 411 (FIG. 3) may be operable to provide a pointer, other indication and/or information, which specifies the corresponding content for the messages for a detected linear advertisement campaign, to the paired second screen communication device 614. The paired second screen communication device 614 utilizes the pointer, other indication and/or information to access the reference advertisement server 409 (FIG. 3) in order to acquire the content for the messages for the detected linear advertisement campaign from the reference advertisement server 409 (FIG. 3). The reference advertisement server 409 (FIG. 3) then serves or delivers the content for the messages for the detected linear advertisement campaign to the paired second screen communication device 614. The pointer, indication and/or other information provided by the advertisement synchronization server 411 (FIG. 3) may specify, for example, the different types of advertisements, the different types of messages, the message frequency cap and/or any other rules that may be related to how messages for the detected linear advertisement campaign may be presented and/or capped. The message frequency cap may comprise a threshold value.

The advertisement logic application or module 614a may be operable to acquire the assets for regular advertisements from the reference advertisement server 409 (FIG. 4) and manage and control presentation of the corresponding messages on the paired second screen communication device 614. For ACR triggered advertisements or messages that comprise ACR triggered events, the advertisement logic application or module 614a may be operable to acquire information from the advertisement synchronization server 411 (FIG. 3) that specifies the assets that are to be utilized. Once the advertisement logic application or module 614a acquires the information that specifies the assets that are to be utilized, the advertisement logic application or module 614a may utilize this information to acquire the corresponding assets from the reference advertisement server 409 (FIG. 3). The advertisement logic application or module 614a may be operable to manage and control presentation of the corresponding messages on the paired second screen communication device 614. The advertisement logic application or module 614a may be operable to manage and/or control the steps 602, 604 and N. In this regard, for example, the advertisement logic application or module 614a may be operable to detect the linear Ad campaign of type X and check whether the corresponding cap limit has been reached. If the cap limit is not reached, then the advertisement logic application or module 614a plays the corresponding message for linear Ad1 campaign of type X on the paired second screen communication device 614. If advertisement logic application or module 614a determines that the cap limit is not reached, then the paired second screen communication device 614 does not play the corresponding message for linear Ad campaign of type X.

Figure 6:
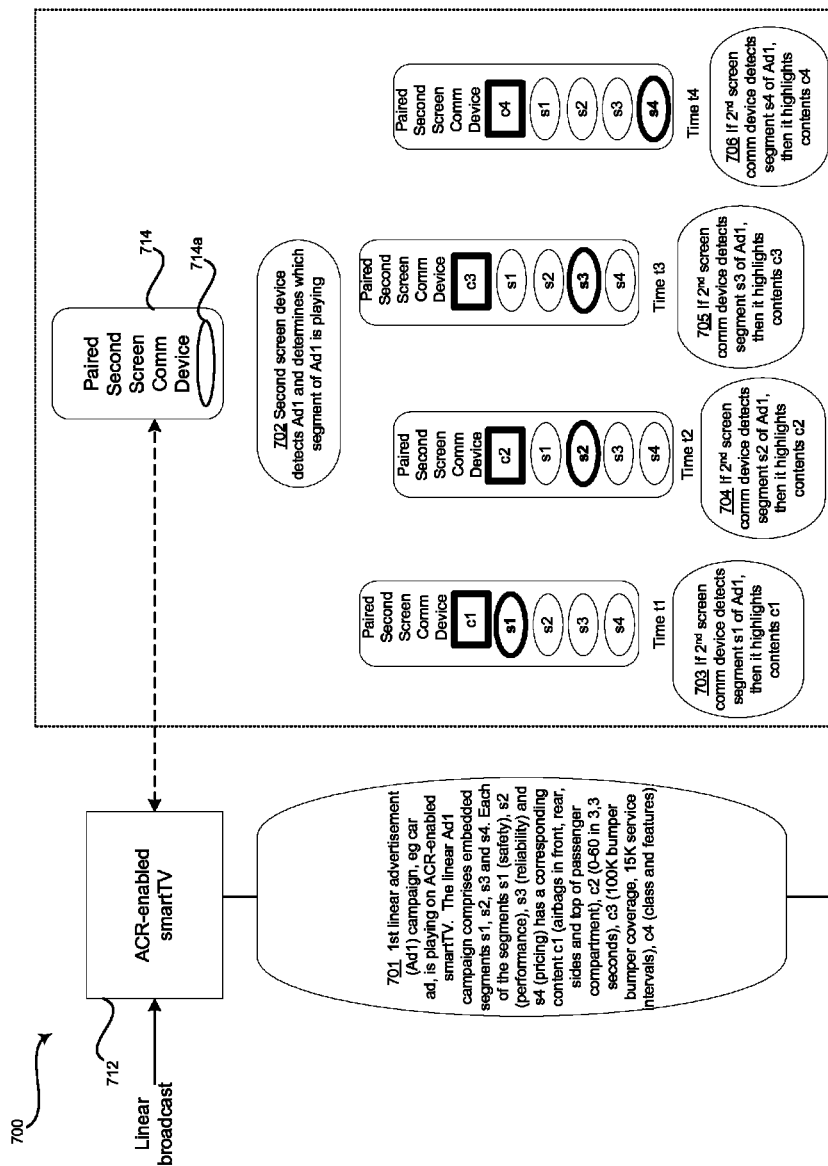
FIG. 6 is a flow diagram that illustrates an exemplary advertisement highlighting process, in accordance with an exemplary embodiment of the disclosure.

FIG. 6 is a flow diagram that illustrates an exemplary advertisement highlighting process, in accordance with an exemplary embodiment of the disclosure. Referring to FIG. 6, there is shown an exemplary advertisement highlighting process 700. For the exemplary advertisement highlighting process 700, there is shown an ACR-enabled smartTV 712, a paired second screen communication device 714 and a plurality of steps 701, through 706. The paired second screen communication device 714 may comprise an advertisement logic application or module 714a. The paired second screen communication device 714 may be substantially similar to the paired second screen communication device 414, which is illustrated and described with respect to, for example, FIG. 3. The advertisement logic application or module 714a may be substantially similar to the advertisement logic application or module 414a, which is illustrated and described with respect to, for example, FIG. 3.

The ACR enabled smartTV 712 is operable to receive a linear broadcast feed. The received a linear broadcast feed may comprise a first linear advertisement (Ad1) campaign. The first linear advertisement (Ad1) campaign may comprise an ACR triggered advertisement or a regular advertisement with no ACR (non-ACR) triggered events. Notwithstanding, the disclosure is not limited in this regard. Accordingly, in some embodiments of the disclosure, the first linear advertisement (Ad1) campaign may comprise some content, which may be ACR triggered and some content which may be non-ACR triggered. For example, a first message for the first linear advertisement (Ad1) campaign may be ACR-triggered and a second message for the first linear advertisement (Ad1) campaign may be non-ACR triggered.

The first linear advertisement (Ad1) campaign may comprise a plurality of segments. Each of the plurality of segments may be tailored to address a different aspect of the first linear advertisement (Ad1) campaign. In an exemplary embodiment of the disclosure, the first linear advertisement (Ad1) campaign may comprise four segments, namely s1, s2, s3, s4, and the segments s1, s2, s3, s4 may be tailored to address safety, performance, reliability and pricing, respectively.

In step 701, the first linear advertisement (Ad1) campaign plays on the ACR-enabled smartTV 712. In an exemplary embodiment of the disclosure, the first linear advertisement (Ad1) campaign may comprise a car advertisement. The first linear advertisement (Ad1) campaign may comprise embedded segments s1 addressing safety, s2 addressing performance, s3 addressing reliability and s4 addressing pricing. Each of the segments s1, s2, s3, s4 has a corresponding content c1, c2, c3, c4, respectively. The content c1 for the segment s1 comprises subject matter addressing airbags in the front, rear, sides and top of the passenger compartment. The content c2 for the segment s2 comprises subject matter addressing acceleration of 0-60 mph in 3.3 seconds. The content c3 for the segment s3 comprises subject matter addressing 100 K miles of bumper-to-bumper warranty coverage and 15 K miles between service intervals. The content c4 for the segment s4 comprises subject matter addressing class and various features.

In step 702, if the paired second screen communication device detects the safety segment s1 for the first linear advertisement (Ad1) campaign, then the content for c1, namely, airbags in the front, rear, sides and top of the passenger compartment, is highlighted.

In step 704, if the paired second screen communication device detects the performance segment s2 for the first linear advertisement (Ad1) campaign, then the content for c2, namely, acceleration of 0-60 mph in 3.3 seconds, is highlighted. Other information such as horsepower (100 bhp), maximum speed (120 mph), mileage (50 mpg) and range on a tank of gas (700 miles) may also be highlighted.

In step 706, if the paired second screen communication device detects the reliability segment s3 for the first linear advertisement (Ad1) campaign, then the content for c3, namely, 100 K miles of bumper-to-bumper or engine and drivetrain warranty coverage and 15 K miles between service intervals, is highlighted.

In step 708, if the paired second screen communication device detects the pricing segment s4 for the first linear advertisement (Ad1) campaign, then the content for c4, namely, class and features 100 K miles of bumper-to-bumper warranty coverage and 15 K miles between service intervals, is highlighted. For the pricing segment s4, detailed information related to the different models, options, packages, financing, and pricing may also be highlighted. Various options may also be provided to schedule a test drive, make arrangement for financing and/or to purchase the car may also be provided.

In accordance with various embodiments of the disclosure, automatic content recognition may be utilized to detect context when a specific segment or portion of the first linear advertisement (Ad1) campaign should be highlighted. In this regard, an automatic content recognition event may be triggered when context related the specific segment is detected.

The paired second screen communication device 714 is operable to acquire information that specifies the assets that are to be utilized for an ACR event triggered advertisement from the advertisement synchronization server 411 (FIG. 3). Once the paired second screen communication device 714 acquires the information that specifies the assets that are to be utilized for the ACR event triggered advertisements from the advertisement synchronization server 411 (FIG. 3), the paired second screen communication device 714 may utilize this information to acquire the corresponding assets from the reference advertisement server 409 (FIG. 3).

In an exemplary embodiment of the disclosure, the advertisement synchronization server 411 (FIG. 3) may be operable to provide a pointer, other indication and/or information, which specifies the corresponding content c1, c2, c3, c4 that is to be highlighted on the paired second screen communication device 714 for the detected segments s1, s2, s3, s4, respectively, for the first linear advertisement (Ad1) campaign. The information may specify the different segments that should be highlighted, the information to be highlighted for the different segments, the corresponding timing, and/or the audio and/or video attributes of the content that is to be highlighted. The paired second screen communication device 714 utilizes the pointer, other indication and/or information to access the reference advertisement server 409 (FIG. 3) in order to acquire the content c1, c2, c3, c4 for the detected segments s1, s2, s3, s4, respectively, for the detected linear advertisement campaign, from the reference advertisement server 409 (FIG. 3). The reference advertisement server 409 (FIG. 3) then serves or delivers the content c1, c2, c3, c4 for the detected segments s1, s2, s3, s4, respectively, for the first linear advertisement (Ad1) campaign, to the paired second screen communication device 714. The pointer, indication and/or other information provided by the advertisement synchronization server 411 (FIG. 3) may specify, for example, the options associated with the content c1, c2, c3, c4 that is to be highlighted for the detected segments s1, s2, s3, s4, respectively.

The advertisement logic application or module 714*a* may be operable to acquire the assets for regular advertisements from the reference advertisement server 409 (FIG. 4) and manage and control presentation of the corresponding content c1, c2, c3, c4 that is to be highlighted for the detected segments s1, s2, s3, s4, respectively, on the paired second screen communication device 714. For ACR triggered advertisements or messages that comprise ACR triggered events, the advertisement logic application or module 714*a* may be operable to acquire information from the advertisement synchronization server 411 (FIG. 3) that specifies the assets that are to be utilized. Once the advertisement logic application or module 714*a* acquires the information that specifies the assets that are to be utilized, the advertisement logic application or module 714*a* may utilize this information to acquire the corresponding assets from the reference advertisement server 409 (FIG. 3). The advertisement logic application or module 714*a* may be operable to manage and control presentation of the corresponding content c1, c2, c3, c4 that is to be highlighted for the detected segments s1, s2, s3, s4, respectively, on the paired second screen communication device 714. The advertisement logic application or module 714*a* may be operable to manage and/or control the steps 702, 703, 704, 705 and 706. In this regard, for example, the advertisement logic application or module 714*a* may be operable to detect the safety segment s1 of the first linear advertisement (Ad1) campaign and highlight the corresponding content c1. The advertisement logic application or module 714*a* may be operable to detect the performance segment s2 of the first linear advertisement (Ad1) campaign and highlight the corresponding content c2. The advertisement logic application or module 714*a* may be operable to detect the reliability segment s3 of the first linear advertisement (Ad1) campaign and highlight the corresponding content c3. The advertisement logic application or module 714*a* may be operable to detect the pricing segment s4 of the first linear advertisement (Ad1) campaign and highlight the corresponding content c4.

In accordance with some embodiments of the disclosure, the options and/or attributes utilized by the advertisement logic application or module 714*a* to present the content for the corresponding segment may be may be based on the location and/or preferences of the viewer, time of day, season of the year and so on.

Figure 7:
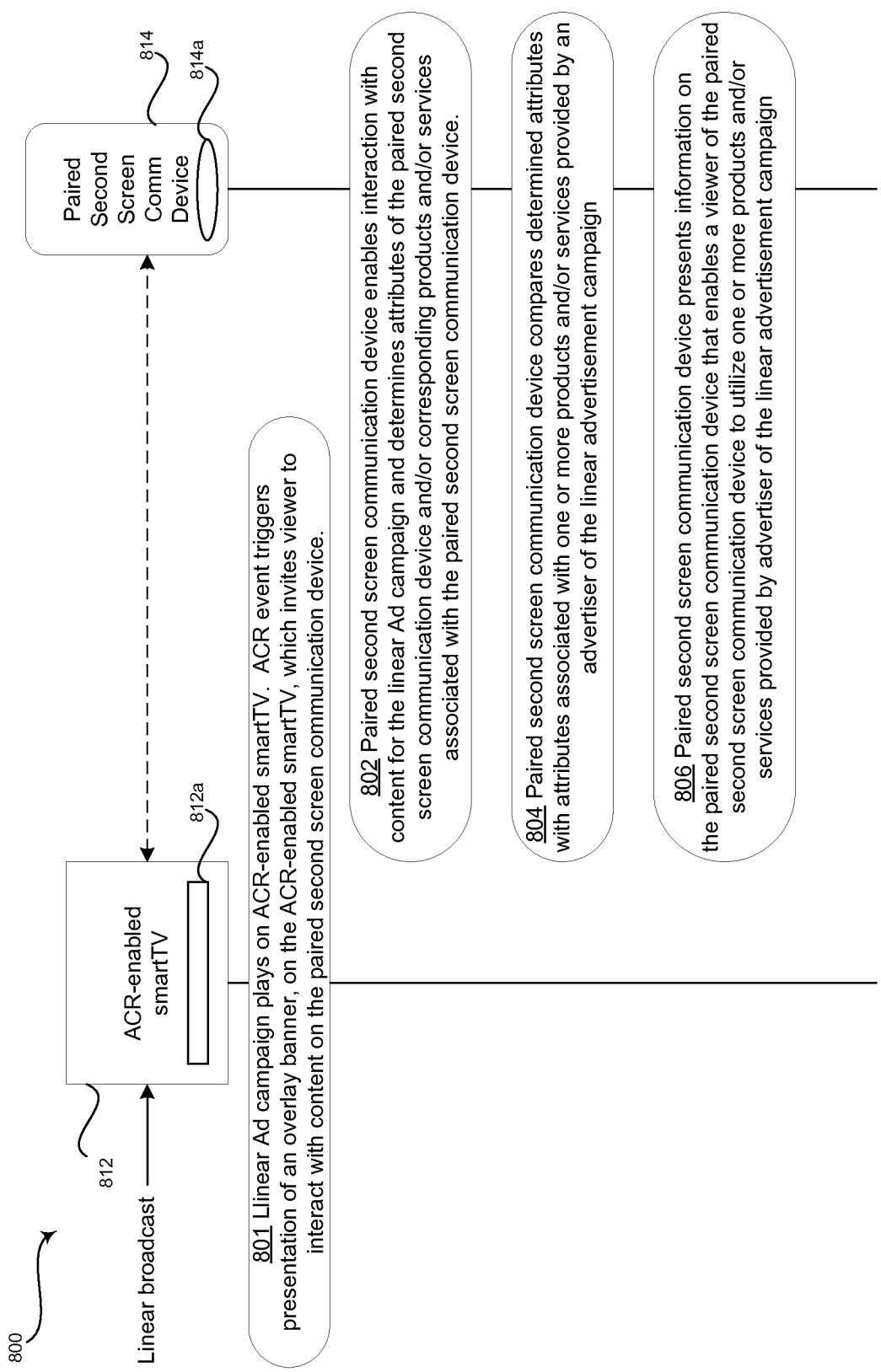
FIG. 7 is a flow diagram that illustrates exemplary offering of products and/or services based on interaction with advertisements, in accordance with an exemplary embodiment of the disclosure.

FIG. 7 is a flow diagram that illustrates exemplary offering of products and/or services based on interaction with advertisements, in accordance with an exemplary embodiment of the disclosure. Referring to FIG. 7, there is shown exemplary offering of products and/or services based on interaction with advertisements 800. For the exemplary offering of products and/or services based on interaction with advertisements 800, there is shown the ACR-enabled smartTV 812 and the paired second screen communication device 814 and a plurality of steps 801 through 806. An overlay banner 812*a* is illustrated on the ACR-enabled smartTV 812.

The paired second screen communication device 814 may comprise an advertisement logic application or module 814*a*. The paired second screen communication device 814 may be substantially similar to the paired second screen communication device 414, which is illustrated and described with respect to, for example, FIG. 3. The advertisement logic application or module 814*a* may be substantially similar to the advertisement logic application or module 414*a*, which is illustrated and described with respect to, for example, FIG. 3.

The ACR enabled smartTV 812 is operable to receive a linear broadcast feed. The received linear broadcast feed may comprise a linear advertisement (Ad) campaign. The linear advertisement (Ad1) campaign may comprise an ACR triggered advertisement or a regular advertisement with no ACR (non-ACR) triggered events. Notwithstanding, the disclosure is not limited in this regard. Accordingly, in some embodiments of the disclosure, the first linear advertisement (Ad1) campaign may comprise some content, which may be ACR triggered and some content which may be non-ACR triggered.

In step 801, a linear advertisement (Ad) campaign plays on the ACR-enabled smartTV 812. An ACR event may trigger presentation of an overlay banner 812a on the ACR-enabled smartTV 812. The overlay banner 812a may invite a viewer of the ACR-enabled smartTV to interact with content (associated with the linear advertisement campaign) on the paired second screen communication device 814. The viewer of the ACR-enabled smartTV may engage the paired second screen communication device in order to interact with the content.

In step 802, the paired second screen communication device 814 may enable interaction with content for the linear advertisement campaign and may determine attributes of the paired second screen communication device 814 and/or corresponding products and/or services associated with the paired second screen communication device 814.

In step 804, the paired second screen communication 814 compares the determined attributes with attributes associated with one or more products and/or services provided by an advertiser of the linear advertisement campaign.

In step 806, the paired second screen communication device 814 presents information on the paired second screen communication device 814 that enables a viewer of the paired second screen communication device 814 to utilize one or more products and/or services provided by the advertiser of the linear advertisement campaign.

For non-ACR events, the paired second screen communication device 814 may go directly to the RAS 409 (FIG. 3) for information and/or assets related to the linear advertisement campaign as well as one or more products and/or services provided by the advertiser of the linear advertisement campaign.

For ACR events, the paired second screen communication device 814 may access the ASS 411 (FIG. 3), which may provide a pointer, other indication and/or information to the assets related to the linear advertisement campaign as well as one or more products and/or services provided by the advertiser of the linear advertisement campaign. The paired second screen communication device 814 may utilize the provided pointer, other indication and/or information to request the assets related to the linear advertisement campaign as well as one or more products and/or services provided by the advertiser of the linear advertisement campaign from the RAS 409 (FIG. 3). The RAS 409 (FIG. 3) may deliver the assets to the paired second screen communication device 814.

The advertisement logic application or module 814a on the paired second screen communication device 814 may be operable to control acquisition of the assets related to the linear advertisement campaign as well as one or more products and/or services provided by the advertiser of the linear advertisement campaign. For regular advertisement, the advertisement logic application or module 814a may be operable to acquire the assets from the reference advertisement server 409 (FIG. 4) and manage and control presentation of information related to the linear advertisement campaign as well as one or more products and/or services provided by the advertiser of the linear advertisement campaign. The advertisement logic application or module 814a may be operable to determine attributes of the paired second screen communication device 814 and/or corresponding products and/or services associated with the paired second screen communication device. The advertisement logic application or module 814a may be operable to compare the determined attributes with attributes associated with one or more products and/or services provided by the advertiser of the linear advertisement campaign. Based on the comparison, the advertisement logic application or module 814a may be operable to manage and control presentation of information that may enable a viewer of the paired second screen communication device 814 to utilize or acquire information on one or more products and/or services provided by an advertiser of the linear advertisement campaign.

For ACR triggered advertisements that comprise ACR triggered events, the advertisement logic application or module 814a may be operable to acquire information from the advertisement synchronization server 411 (FIG. 3) that specifies the assets that are to be utilized. Once the advertisement logic application or module 814a acquires the information that specifies the assets that are to be utilized, the advertisement logic application or module 814a may utilize this information to acquire the corresponding assets from the reference advertisement server 409 (FIG. 3). The advertisement logic application or module 814a may be operable to manage and control manage and control presentation of information related to the linear advertisement campaign as well as one or more products and/or services provided by the advertiser of the linear advertisement campaign. The advertisement logic application or module 814a may be operable to determine attributes of the paired second screen communication device 814 and/or corresponding products and/or services associated with the paired second screen communication device. The advertisement logic application or module 814a may be operable to compare the determined attributes with attributes associated with one or more products and/or services provided by the advertiser of the linear advertisement campaign. The advertisement logic application or module 814a may be operable to manage and control presentation of information that may enable a viewer of the paired second screen communication device 814 to utilize or acquire information on one or more products and/or services provided by an advertiser of the linear advertisement campaign based on the comparison.

The advertisement logic application or module 814a may be operable to manage and/or control execution of the steps 801, 802, 804 and 806.

Figure 8:
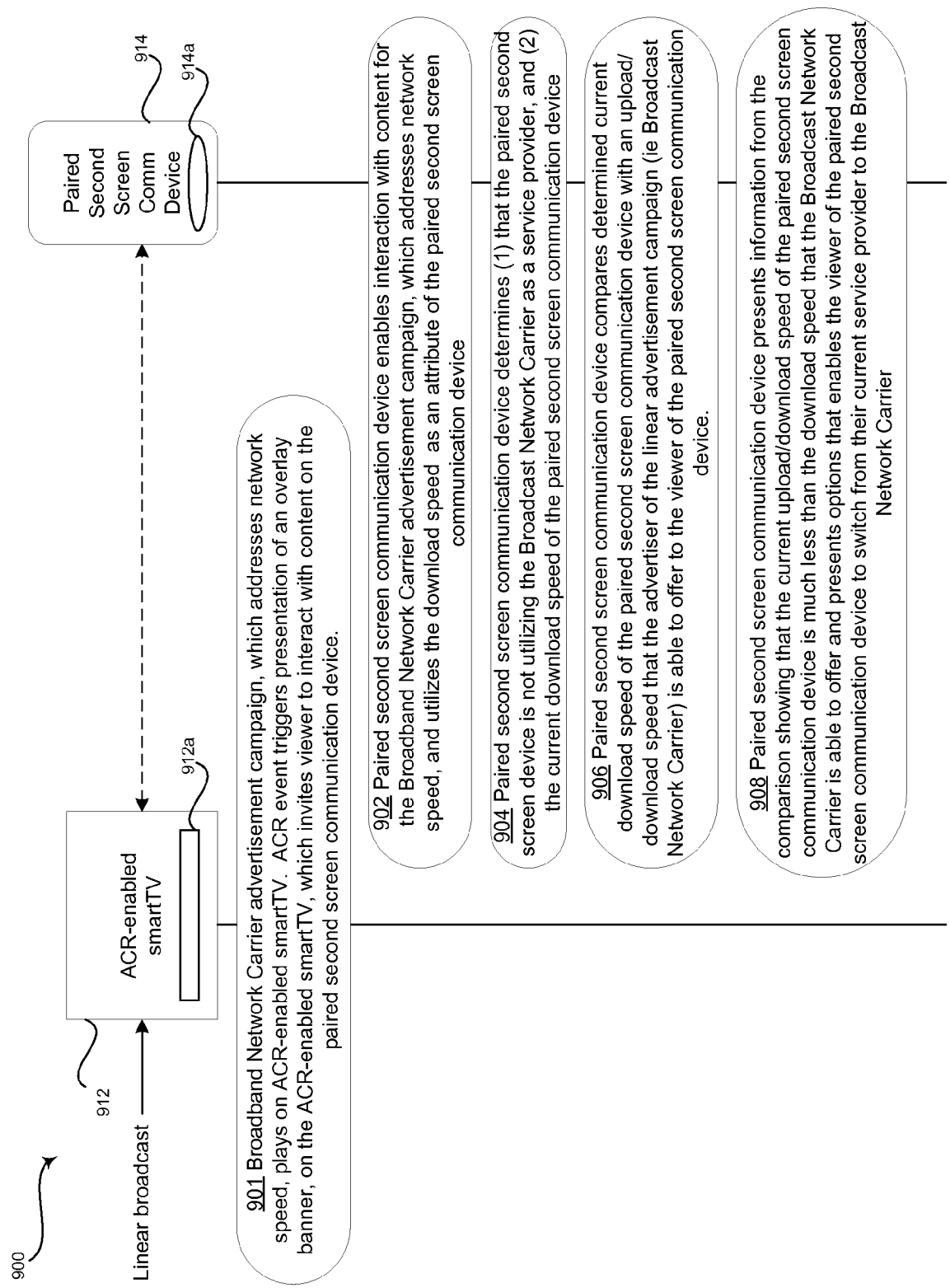
FIG. 8 is a flow diagram that illustrates exemplary offering of network services based on interaction with advertisements, in accordance with an exemplary embodiment of the disclosure.

FIG. 8 is a flow diagram that illustrates exemplary offering of network services based on interaction with advertisements, in accordance with an exemplary embodiment of the disclosure. Referring to FIG. 8, there is shown exemplary offering of network services based on interaction with advertisements 900. For the exemplary offering of network services based on interaction with advertisements 900, there is shown the ACR-enabled smartTV 912 and the paired second screen communication device 914 and a plurality of steps 901 through 908. An overlay banner 912a is illustrated on the ACR-enabled smartTV 912.

The paired second screen communication device 914 may comprise an advertisement logic application or module 914a. The paired second screen communication device 914 may be substantially similar to the paired second screen communication device 814, which is illustrated and described with respect to, for example, FIG. 7. The advertisement logic application or module 914a may be substantially similar to the advertisement logic application or module 814a, which is illustrated and described with respect to, for example, FIG. 7.

In step 901, a Broadband Network Carrier advertisement campaign, which addresses network speed, is played on an ACR-enabled smartTV. The ACR event may trigger presentation of an overlay banner, on the ACR-enabled smartTV 912, which invites a viewer of the ACR-enabled smartTV 912 to interact with content on the paired second screen communication device 914.

In step 902, the paired second screen communication device 914 enables interaction with content for the broadband network carrier advertisement campaign, which addresses network speed, and utilizes the download speed as an attribute of the paired second screen communication device 914.

In step 904, the paired second screen communication device 914 determines that the paired second screen device is not utilizing the Broadcast Network Carrier as a service provider. The paired second screen communication device 914 may determine the current download speed of the paired second screen communication device 914. For example, the advertisement logic application or module 914a may be operable to execute a network speed test to determine the upload and/or download speeds. In step 906, the paired second screen communication device 914 compares the determined current download speed of the paired second screen communication device 914 with an upload and/or download speed that the advertiser of the linear advertisement campaign, namely, the Broadcast Network Carrier, is able to offer to the viewer of the paired second screen communication device 914.

In step 908, the paired second screen communication device 914 presents information from the comparison showing that the current upload and/or download speed of the paired second screen communication device 914 is much less than the download speed that the Broadcast Network Carrier is able to offer. Additional information which may entice the viewer to switch to the Broadcast Network Carrier may also be presented to the viewer on the paired second screen communication device 914. This additional information may be in the form of visualizations, download and coverage geographical maps. The paired second screen communication device 914 may also be operable to present one or more options that enables the viewer of the paired second screen communication device 914 to switch from their current service provider to the Broadcast Network Carrier.

The advertisement logic application or module 914a may be operable to manage and/or control execution of the steps 901, 902, 904, 906 and 908.

In an exemplary embodiment of the disclosure, information from the ASS 411 (FIG. 3) may be utilized to determine whether or not the paired second screen device 914 may be utilizing the Broadcast Network Carrier as a current service provider. Information from the ASS 411 (FIG. 3) may also be utilized to detect the upload and/or download speeds, and/or to provide various option for the viewer to switch the products and/or services provided by the Broadcast Network Carrier. The paired second screen communication device may, for example, receive a link to an application (app) or website which may be utilized to run the network test. The link to the application (app) or website may be determined based on information from the ASS 411 (FIG. 3).

In general, the offering of network services based on interaction with advertisements may comprise detecting an advertisement on an ACR-enabled smartTV and on a paired second screen communication device, utilize an existing attribute associated with the paired second screen communication device such as network features and/or capabilities, preferences, screen size and/or operating system, to compare with a product and/or service offering that may be provided by an advertiser of the advertisement. In instances where the advertiser's product and/or service offering has, for example, more features and/or better quality, than the viewer's current service provider, the viewer may be provided with an option to switch from their current service to the product and/or service offering being offered by the advertiser of the advertisement.

In various exemplary embodiments of the disclosure, a second screen communication device 514 (FIG. 4) that is paired with an automatic content recognition (ACR) enabled display communication device 512 is operable to detect presentation of a linear advertisement campaign on the automatic content recognition enabled display communication device 514 and control presentation of content, which is associated with the linear advertisement campaign, on the second screen communication device 514. The content that is associated with the linear advertisement campaign comprises a plurality of messages, for example, m1, m2, m3, m4. The second screen communication device 514 is operable to select one or more of the plurality of messages m1, m2, m3, m4 for presentation on the second screen communication 514 whenever the linear advertisement campaign is detected during the presentation on the automatic content recognition enabled display communication device 512. The screen communication device 514 may be operable to sequence through presentation of the plurality of messages m1, m2, m3, m4 on the automatic content recognition enabled display communication device 512 based on the selection.

In another embodiment of the disclosure, a second screen communication device 614 (FIG. 5) may be operable to track a frequency at which one or more of the plurality of messages is presented on the second screen communication device 614. The content associated with the one or more of the plurality of messages may be presented on the second screen communication device 614 if the frequency of one or more of the plurality of messages is less than a particular threshold value. The second screen communication device 614 may be operable to bar presentation of the content associated with one or more of the plurality of messages if the frequency of one or more of the plurality of messages is greater than the particular threshold value.

In another embodiment of the disclosure, a second screen communication device 714 (FIG. 6) may be operable to determine which one of a plurality of segments s1, s2, s3, s4 of the linear advertisement campaign is being presented on the second screen communication device 714. The second screen communication device 714 may be operable to present content c1, c2, c3, c4 corresponding to the determined one of the plurality of segments s1, s2, s3, s4 on the second screen communication device 714.

In another embodiment of the disclosure, a second screen communication device 814 (FIG. 7) may be operable to determine one or more attributes that enables the presentation of the content that is associated with the linear advertisement campaign on the second screen communication device 814 and compare the determined one or more attributes to one or more attribute associated with one or more products and/or services provided by advertiser of the linear advertisement campaign. The second screen communication device 814 may be operable to present information on the second screen communication device 814 that enables a viewer of the second screen communication device 814 to utilize the one or more products and/or services provided by advertiser of the linear advertisement campaign.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Other embodiments of the disclosure may provide a computer readable device and/or a non-transitory computer readable medium, and/or a machine readable device and/or a non-transitory machine readable medium, having stored thereon, a machine code and/or a computer program having at least one code section executable by a machine and/or a computer, thereby causing the machine and/or computer to perform the steps as described herein for providing synchronized advertisements and services.

Accordingly, the present disclosure may be realized in hardware, software, or a combination of hardware and software. The present disclosure may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method, comprising:
in a second screen communication device that is paired with an automatic content recognition enabled display communication device:
detecting presentation of a linear advertisement campaign for an advertised item on said automatic content recognition enabled display communication device, wherein said linear advertisement campaign for said advertised item comprises a plurality embedded segments, and each of said plurality of embedded segments targets a specific aspect of said advertised item;
controlling on said second screen communication device, presentation of corresponding content for each of said plurality of embedded segments, wherein the corresponding content targets said specific aspect of said advertised item; and
tracking a frequency at which said corresponding content for each of said plurality of embedded segments that targets said specific aspect of said advertised item are presented on said second screen communication device.

2. The method according to claim 1, comprising selecting one or more of a plurality of messages for presentation on said second screen communication device whenever said linear advertisement campaign is detected during said presentation on said automatic content recognition enabled display communication device, wherein the corresponding content comprises the plurality of messages.

3. The method according to claim 2, comprising sequencing through presentation of the plurality of messages on said second screen communication device based on said selection.

4. The method according to claim 1, comprising presenting said corresponding content for each of said plurality of embedded segments that targets said specific aspect of said advertised item if said frequency is less than a particular threshold value.

5. The method according to claim 4, comprising barring presentation of said corresponding content for each of said plurality of embedded segments that targets said specific aspect of said advertised item if said frequency is greater than a particular threshold value.

6. The method according to claim 1, comprising determining which one of said plurality of embedded segments that targets said specific aspect of said advertised item is being presented on said second screen communication device.

7. The method according to claim 6, comprising presenting said corresponding content for each of said plurality of embedded segments that targets said specific aspect of said advertised item on said second screen communication device based on said determining.

8. The method according to claim 1, comprising:
determining one or more attributes that enables said presentation of said corresponding content for each of said plurality of embedded segments that targets said specific aspect of said advertised item on said second screen communication device;
comparing said determined one or more attributes to one or more attributes associated with one or more products and/or services provided by an advertiser of said linear advertisement campaign; and
presenting information on said second screen communication device that enables a viewer of said second screen communication device to utilize said one or more products and/or services provided by advertiser of said linear advertisement campaign.

9. A system, comprising:
a second screen communication device that is paired with an automatic content recognition enabled display communication device, said second screen communication device being operable to:
  detect presentation of a linear advertisement campaign for an advertised item on said automatic content recognition enabled display communication device, wherein said linear advertisement campaign for said advertised item comprises a plurality embedded segments, and each of said plurality of embedded segments targets a specific aspect of said advertised item;
  control on said second screen communication device, presentation of corresponding content for each of said plurality of embedded segments, wherein the corresponding content targets said specific aspect of said advertised item; and
  track a frequency at which said corresponding content for each of said plurality of embedded segments that targets said specific aspect of said advertised item are presented on said second screen communication device.

10. The system according to claim 9, wherein said second screen communication device is operable to select one or more of a plurality of messages for presentation on said second screen communication device whenever said linear advertisement campaign is detected during said presentation on said automatic content recognition enabled display communication device.

11. The system according to claim 10, wherein said second screen communication device is operable to sequence through presentation of the plurality of messages on said second screen communication device based on said selection.

12. The system according to claim 9, comprising presenting corresponding content for each of said plurality of embedded segments that targets said specific aspect of said advertised item if said frequency is less than a particular threshold value.

13. The system according to claim 12, wherein said second screen communication device is operable to bar presentation of said said corresponding content for each of said plurality of embedded segments that targets said specific aspect of said advertised item if said frequency is greater than said particular threshold value.

14. The system according to claim 9, wherein:
  said second screen communication device is operable to determine which one of plurality of embedded segments that targets said specific aspect of said advertised item is being presented on said second screen communication device; and
  said second screen communication device is operable to present said corresponding content for each of said plurality of embedded segments that targets said specific aspect of said advertised item on said second screen communication device.

15. The system according to claim 9, wherein said second screen communication device is operable to:
  determine one or more attributes that enables said presentation of said corresponding content for each of said plurality of embedded segments that targets said specific aspect of said advertised item on said second screen communication device;
  compare said determined one or more attributes to one or more attributes associated with one or more products and/or services provided by advertiser of said linear advertisement campaign; and
  present information on said second screen communication device that enables a viewer of said second screen communication device to utilize said one or more products and/or services provided by advertiser of said linear advertisement campaign.

16. A non-transitory computer readable medium having stored thereon, a computer program having at least one code section being executable by a machine for causing the machine to perform steps comprising:
  in a second screen communication device that is paired with an automatic content recognition enabled display communication device:
  in a second screen communication device that is paired with an automatic content recognition enabled display communication device:
    detecting presentation of a linear advertisement campaign for an advertised item on said automatic content recognition enabled display communication device, wherein said linear advertisement campaign for said advertised item comprises a plurality embedded segments, and each of said plurality of embedded segments targets a specific aspect of said advertised item;
    controlling on said second screen communication device, presentation of corresponding content for each of said plurality of embedded segments, wherein the corresponding content targets said specific aspect of said advertised item; and
    tracking a frequency at which said corresponding content for each of said plurality of embedded segments that targets said specific aspect of said advertised item are presented on said second screen communication device.

* * * * *